(12) United States Patent
Imai

(10) Patent No.: US 7,882,559 B2
(45) Date of Patent: Feb. 1, 2011

(54) ELECTRONIC DOCUMENT PROCESSING SYSTEM, ELECTRONIC DOCUMENT PROCESSING METHOD, AND STORING MEDIUM STORING THEREIN PROGRAM FOR EXECUTING THE METHOD

(75) Inventor: Satoshi Imai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1094 days.

(21) Appl. No.: 10/832,403

(22) Filed: Apr. 27, 2004

(65) Prior Publication Data

US 2004/0221234 A1 Nov. 4, 2004

(30) Foreign Application Priority Data

May 2, 2003 (JP) ............................. 2003-126835
Apr. 15, 2004 (JP) ............................. 2004-120453

(51) Int. Cl.
*G06F 21/00* (2006.01)
*G06F 21/06* (2006.01)
*G06F 12/00* (2006.01)
*G06F 12/14* (2006.01)

(52) U.S. Cl. ................... 726/21; 726/2; 726/4; 726/17; 713/1; 713/100; 709/220; 709/221; 709/225; 707/783; 707/781

(58) Field of Classification Search ........................ None
See application file for complete search history.

(56) References Cited

U.S. PATENT DOCUMENTS

| | | | | |
|---|---|---|---|---|
| 5,438,508 | A * | 8/1995 | Wyman ........................... | 705/8 |
| 5,638,443 | A | 6/1997 | Stefik et al. ..................... | 380/4 |
| 6,088,131 | A | 7/2000 | Imai et al. ...................... | 358/450 |
| 6,141,754 | A * | 10/2000 | Choy ............................ | 726/1 |
| 6,301,018 | B1 | 10/2001 | Maeda et al. ............... | 358/449 |
| 6,417,935 | B1 | 7/2002 | Saito et al. ................... | 358/450 |
| 6,563,607 | B1 | 5/2003 | Nakamura et al. ........... | 358/450 |
| 7,162,633 | B2 * | 1/2007 | Wang et al. .................. | 713/168 |
| 7,181,628 | B2 * | 2/2007 | Sato et al. .................... | 713/189 |
| 7,281,274 | B2 * | 10/2007 | Manning et al. .............. | 726/31 |

(Continued)

FOREIGN PATENT DOCUMENTS

JP 1-191255 8/1989

(Continued)

*Primary Examiner*—Syed A. Zia
(74) *Attorney, Agent, or Firm*—Fitzpatrick, Cella, Harper & Scinto

(57) ABSTRACT

A document processing system which can form, for example, an electronic document that is encrypted, having: setting means for setting access permission attributes for restricting a predetermined function request and ID information per function into the electronic document; storing means for storing the electronic document in which the access permission attributes are set so that the electronic document can be updated; an access information management table for managing the access permission attributes of each electronic document and the ID information which are set into the electronic document by the setting means; and electronic document managing means for updating the access permission attributes and the ID information set in the electronic document in response to a change request for the access permission attributes and the ID information after the electronic document was registered into the storing means and updating contents in the access information management table on the basis of the changed access permission attributes and the changed ID information so as to be matched.

4 Claims, 37 Drawing Sheets

U.S. PATENT DOCUMENTS

| | | | |
|---|---|---|---|
| 7,703,036 B2 * | 4/2010 | Satterfield et al. | 715/777 |
| 7,707,642 B1 * | 4/2010 | Herbach et al. | 726/27 |
| 2002/0015494 A1 * | 2/2002 | Nagai et al. | 380/201 |
| 2003/0079133 A1 * | 4/2003 | Breiter et al. | 713/182 |
| 2004/0034794 A1 * | 2/2004 | Mayer et al. | 713/200 |
| 2005/0097061 A1 * | 5/2005 | Shapiro et al. | 705/67 |
| 2007/0150299 A1 * | 6/2007 | Flory | 705/1 |

FOREIGN PATENT DOCUMENTS

| | | |
|---|---|---|
| JP | 8-263439 | 10/1996 |
| JP | 2002-288043 | 10/2002 |

* cited by examiner

FIG. 6

| PAGE USING FONT OF IWP | NAME OF FILE WHICH IS REGISTERED INTO OS | NAME OF FONT WHICH IS REGISTERED INTO OS |
|---|---|---|
| PAGE 1 | NewDTXDEF+Century112 5040100. ttf | NewDTXDEF+Century112 5040100 |
| PAGE 1/PAGE 2 | FORMED AT PAGE 1 | |
| PAGE 1 | | |
| PAGE 1/PAGE 2 | FORMED AT PAGE 1 | |
| PAGE 1 | | |
| PAGE 1/PAGE 2 | FORMED AT PAGE 1 | |
| PAGE 1/PAGE 2 | FORMED AT PAGE 1 | |
| PAGE 1/PAGE 2 | FORMED AT PAGE 1 | |
| PAGE 2 | NEWLY FORMED IN PAGE 2 | |
| PAGE 2 | NEWLY FORMED IN PAGE 2 | |
| PAGE 2 | NEWLY FORMED IN PAGE 2 | |
| PAGE 2 | NEWLY FORMED IN PAGE 2 | |
| PAGE 2 | NEWLY FORMED IN PAGE 2 | |
| PAGE 2 | NEWLY FORMED IN PAGE 2 | |
| | | |
| | | |
| | | |
| | | |
| | | |

FIG. 9

FONT 001 ·····································
FONT 002 ·····································
FONT 003 ·····································
FONT 004 ·····································
FONT 005 ·····································

FONT N-1 ·····································
FONT N   ·····································
FONT N+1 ·····································

FIG. 17

| PRINT ID | RESTRICTION COUNTER | VALID TERM |
|---|---|---|
| P172242291530001 | 10 | 20031231 |
| P172242291540001 | -1 (UNLIMITED) | 20031231 |
| P172242291530002 | 10 | 20031231 |
| ↓ | | |
| ↓ | | |
| ↓ | | |
| ↓ | | |
| ↓ | | |
| ↓ | | |
| ↓ | | |
| P172242291530099 | 1000 | -1 (INDEFINITE PERIOD) |

FIG. 18

| VIEW ID | COUNTER | VALID TERM |
|---|---|---|
| V172242291530001 | 10 | 20031231 |
| V172242291540001 | -1 (UNLIMITED) | 20031231 |
| V172242291530002 | 10 | 20031231 |
| ↓ | | |
| ↓ | | |
| ↓ | | |
| ↓ | | |
| ↓ | | |
| ↓ | | |
| ↓ | | |
| V172242291530099 | 1000 | -1 (INDEFINITE PERIOD) |

FIG. 19

| PRINT ID | PASSWORD FILE NAME |
|---|---|
| P172242291530001 | 000000001.pas |
| P172242291540001 | 000000002.pas |
| P172242291530002 | 000000001.pas |
| ↓ | ↓ |
| ↓ | ↓ |
| ↓ | ↓ |
| ↓ | ↓ |
| ↓ | ↓ |
| ↓ | ↓ |
| P172242291530099 | 000000099.pas |

FIG. 20

| VIEW ID | PASSWORD FILE NAME |
|---|---|
| V172242291530001 | 000000001.pas |
| V172242291540001 | 000000002.pas |
| V172242291530002 | 000000001.pas |
| ↓ | ↓ |
| ↓ | ↓ |
| ↓ | ↓ |
| ↓ | ↓ |
| ↓ | ↓ |
| ↓ | ↓ |
| V172242291530099 | 000000099.pas |

FIG. 21

| DOCUMENT ID | PRINT ID | VIEW ID | EDIT ID |
|---|---|---|---|
| D00000001 | P172242291530001 | V172242291530001 | E172242291530001 |
| D00000002 | P172242291540001 | V172242291540001 | E172242291540001 |
| D00000003 | P172242291530002 | V172242291530002 | E172242291530002 |
| ↓ | ↓ | ↓ | ↓ |
| ↓ | ↓ | ↓ | ↓ |
| ↓ | ↓ | ↓ | ↓ |
| D00000100 | ↓ | ↓ | ↓ |
| ↓ | ↓ | ↓ | ↓ |
| ↓ | ↓ | ↓ | ↓ |
| ↓ | ↓ | ↓ | ↓ |
| ↓ | ↓ | ↓ | ↓ |
| D00000999 | P172242291530099 | V172242291530099 | E172242291530099 |

| CONTENTS EX ID | PUBLIC USER ID |
|---|---|
| C172242291530001 | U00000001 |
| C172242291540001 | U00000002 |
| C172242291530002 | U00000003 |
| ↓ | ↓ |
| ↓ | ↓ |
| ↓ | ↓ |
| ↓ | U00000100 |
| ↓ | ↓ |
| ↓ | ↓ |
| ↓ | ↓ |
| C172242291530099 | U00000999 |

FIG. 27

|   | TYPE 1 FONT NAME | SUBSTITUTION FONT NAME |
|---|---|---|
| 1 | RYUMIN L-KL | MS GOTHIC |
| 2 | MIDDLE GOTHIC BBB | MS MING TYPE |
| 3 | . | . |
| 4 | . | . |
| . | . | . |
| . | . | . |
| . | . | . |

FIG. 32

STORING MEDIUM SUCH AS FD/CD-ROM, ETC.

| DIRECTORY INFORMATION |
|---|
| 1ST DATA PROCESSING PROGRAM PROGRAM CODE GROUP CORRESPONDING TO STEPS IN FLOWCHART SHOWN IN FIG. 11 |
| 2ND DATA PROCESSING PROGRAM PROGRAM CODE GROUP CORRESPONDING TO STEPS IN FLOWCHART SHOWN IN FIG. 12 |
| 3RD DATA PROCESSING PROGRAM PROGRAM CODE GROUP CORRESPONDING TO STEPS IN FLOWCHART SHOWN IN FIG. 13 |
| 4TH DATA PROCESSING PROGRAM PROGRAM CODE GROUP CORRESPONDING TO STEPS IN FLOWCHART SHOWN IN FIG. 14 |
| 5TH DATA PROCESSING PROGRAM PROGRAM CODE GROUP CORRESPONDING TO STEPS IN FLOWCHART SHOWN IN FIG. 15 |
| 6TH DATA PROCESSING PROGRAM PROGRAM CODE GROUP CORRESPONDING TO STEPS IN FLOWCHART SHOWN IN FIG. 16 |
| 7TH DATA PROCESSING PROGRAM PROGRAM CODE GROUP CORRESPONDING TO STEPS IN FLOWCHARTS SHOWN IN FIGS. 22 AND 23 |
| 8TH DATA PROCESSING PROGRAM PROGRAM CODE GROUP CORRESPONDING TO STEPS IN FLOWCHART SHOWN IN FIG. 24 |
| 9TH DATA PROCESSING PROGRAM PROGRAM CODE GROUP CORRESPONDING TO STEPS IN FLOWCHART SHOWN IN FIG. 26 |
| 10TH DATA PROCESSING PROGRAM PROGRAM CODE GROUP CORRESPONDING TO STEPS IN FLOWCHART SHOWN IN FIG. 28 |
| 11TH DATA PROCESSING PROGRAM PROGRAM CODE GROUP CORRESPONDING TO STEPS IN FLOWCHART SHOWN IN FIG. 29 |

MEMORY MAP IN STORING MEDIUM

FIG. 33

| EDIT ID | RESTRICTION COUNTER | VALID TERM |
|---|---|---|
| E172242291530001 | 10 | 20031231 |
| E172242291540001 | -1 (UNLIMITED) | 20031231 |
| E172242291530002 | 10 | 20031231 |
| ↓ | | |
| ↓ | | |
| ↓ | | |
| ↓ | | |
| ↓ | | |
| ↓ | | |
| ↓ | | |
| ↓ | | |
| E172242291530099 | 1000 | -1 (INDEFINITE PERIOD) |

FIG. 34

| CONTENTS EX ID | COUNTER | VALID TERM |
|---|---|---|
| C172242291530001 | 10 | 20031231 |
| C172242291540001 | -1 (UNLIMITED) | 20031231 |
| C172242291530002 | 10 | 20031231 |
| ↓ | | |
| ↓ | | |
| ↓ | | |
| ↓ | | |
| ↓ | | |
| ↓ | | |
| ↓ | | |
| ↓ | | |
| C172242291530099 | 1000 | -1 (INDEFINITE PERIOD) |

FIG. 35

| EDIT ID | PASSWORD FILE NAME |
|---|---|
| E172242291530001 | 000000001.pas |
| E172242291540001 | 000000002.pas |
| E172242291530002 | 000000001.pas |
| ↓ | ↓ |
| ↓ | ↓ |
| ↓ | ↓ |
| ↓ | ↓ |
| ↓ | ↓ |
| ↓ | ↓ |
| ↓ | ↓ |
| ↓ | ↓ |
| E172242291530099 | 000000099.pas |

FIG. 36

| CONTENTS EX ID | PASSWORD FILE NAME |
|---|---|
| C172242291530001 | 000000001.pas |
| C172242291540001 | 000000002.pas |
| C172242291530002 | 000000001.pas |
| ↓ | ↓ |
| ↓ | ↓ |
| ↓ | ↓ |
| ↓ | ↓ |
| ↓ | ↓ |
| ↓ | ↓ |
| ↓ | ↓ |
| ↓ | ↓ |
| C172242291530099 | 000000099.pas |

# ELECTRONIC DOCUMENT PROCESSING SYSTEM, ELECTRONIC DOCUMENT PROCESSING METHOD, AND STORING MEDIUM STORING THEREIN PROGRAM FOR EXECUTING THE METHOD

BACKGROUND OF THE INVENTION

1. Field of the Invention

The invention relates to a processing system of an electronic document, a document processing method, and computer-readable storing medium and program.

2. Related Background Art

Hitherto, for the case of converting document information into electronic data and managing it in a storing apparatus, various document managing systems have been proposed. In order to meet a demand for realizing a network system, a system in which the user can browse various information via an arbitrary network has also been put into practical use.

Such a browsing system is constructed in such a manner that an electronic document is encrypted and managed and for a browsing function process and a printing function process of the electronic document, permission attributes for restricting those functions, respectively, are set, thereby enabling the electronic document to be managed.

SUMMARY OF THE INVENTION

However, in the example of the conventional system, there is such a problem that since the permission attributes of the electronic document cannot be changed once the document is formed by an application, when the user wants to change the attributes set and registered in the electronic document which has been stored and managed into different attributes, even in the same electronic document, such complicated registering processes that permission attributes to be newly set are formed and registered again into the storing apparatus, and the like, are necessary, so that a large amount of storing resources are necessary.

There is also such a problem that since the user needs to execute overlapped data processes when the permission attributes are changed, managing processes of the electronic document in which the permission attributes are set are complicated, so that it is inconvenient.

Further, when a system form is not limited to the case of a stand-alone system but is a networked document processing system or a network system in which an existing security system having a specific firewall intervenes, since the attribute change itself cannot be made, the user is burdened with an even more complicated operation. Therefore, it is demanded to improve such a drawback.

The invention is made to solve at least one of the above problems and according to one aspect of an embodiment, in the case where, in the state where the access permission attributes and ID information per function have been set into the electronic document formed by the application, the electronic document is encrypted, stored, and managed, by setting access permission information into the managed electronic document on the basis of a simple attribute information change instruction and automatically updating the attribute information in accordance with an individual attribute change request regarding the attribute information, predetermined attribute information for executing various data processes of the electronic document which has already been formed can be freely changed.

There are provided a document processing system, a document processing method, and computer-readable storing medium and program in which with respect to an electronic document which has already been formed, in accordance with an attribute change request from the user, attributes set into the formed electronic document can be freely changed into attributes (including permission attributes of browsing, printing, and the like) which are different from those upon registration and managed by the simple operation without repeating similar electronic document forming processes by expanding or restricting the original attributes and excellent use convenience is obtained.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a diagram showing relations among "Page" in which each font shown in FIG. 5 is used, "Name of file which is registered into OS", and "Name of FONT which is registered into OS";

FIG. 9 is a diagram showing an example of a registration table in the document processing system according to the embodiment;

FIG. 17 is a diagram showing an example of a table group which is managed by the document access manager shown in FIG. 2;

FIG. 18 is a diagram showing an example of the table group which is managed by the document access manager shown in FIG. 2;

FIG. 19 is a diagram showing an example of the table group which is managed by the document access manager shown in FIG. 2;

FIG. 20 is a diagram showing an example of the table group which is managed by the document access manager shown in FIG. 2;

FIG. 21 is a diagram showing an example of the table group which is managed by the document access manager shown in FIG. 2;

FIG. 27 is a diagram showing an example of a substitution designation table of fonts to which a document drawing application shown in FIG. 2 is referred;

FIG. 32 is a diagram for explaining a memory map in a storing medium for storing various data processing programs which can be read out by the document processing system according to the embodiment;

FIG. 33 shows a management table for controlling the number of editing times according to the embodiment;

FIG. 34 shows a management table for controlling the number of Contents extracting times according to the embodiment;

FIG. 35 shows a management table of a password corresponding to an Edit ID according to the embodiment;

FIG. 36 shows a management table of a password corresponding to an Contents ID according to the embodiment;

DETAILED DESCRIPTION OF THE PREFERRED EMBODIMENTS

Figure 1:
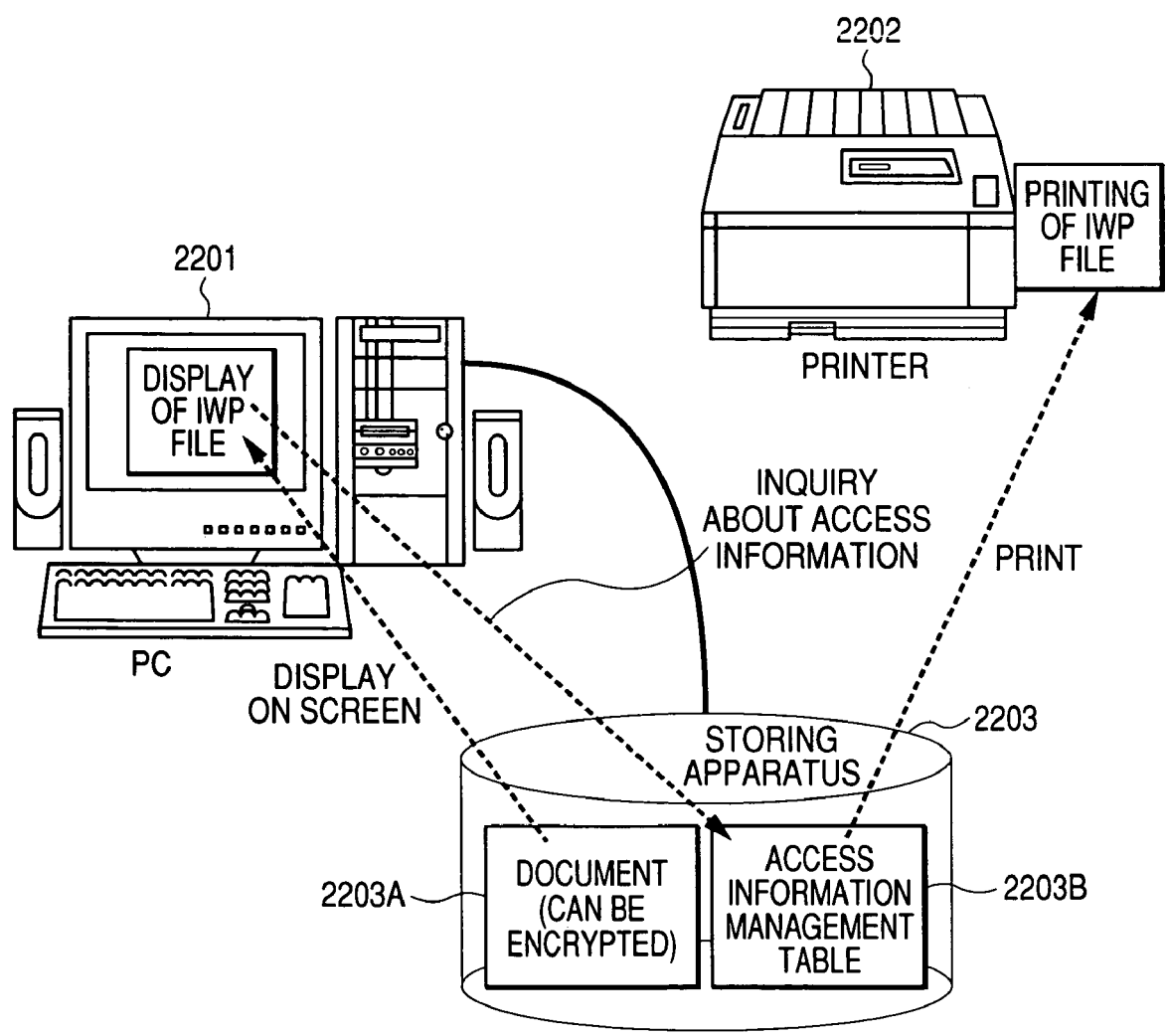
FIG. 1 is a conceptual diagram for explaining a document managing state in a document processing system showing the first embodiment of the invention.

FIG. 1 is a conceptual diagram for explaining a document managing state in a document processing system showing one embodiment of the invention.

In FIG. 1, the system comprises: a PC 2201 such as a personal computer or the like; a storing apparatus 2203 such as a hard disk or the like as, for example, an external storing apparatus which is used by the PC 2201; and a printer 2202 which can communicate through a network. The system is constructed in such a manner that it is possible to load a predetermined operating system which is stored into the storing apparatus 2203 into a RAM or the like as an internal memory (not shown), execute various kinds of applications, and print various kinds of files which are formed by the execution of the applications by the printer 2202.

In the PC 2201, a document forming application and a document drawing application operate and use the storing apparatus 2203. A document 2203A as electronic document information (hereinafter, also simply referred to as an electronic document) formed by the PC 2201 has been stored in the storing apparatus 2203.

An access information management table 2203B is also stored in order to manage access information of those documents.

When the electronic document 2203A is printed, the PC 2201 accesses the storing apparatus 2203 by the operation of the operator and extracts the relevant electronic document. Subsequently, if the electronic document has been encrypted by a predetermined encrypting method, the access information management table 2203B is referred to as necessary. In this instance, if the relevant access information has been registered, a password can be obtained.

Subsequently, if the drawing of the electronic document is permitted, the document is drawn on a display screen. If the printing is permitted, the document is printed by the printer 2202. If neither of them is permitted, the operator is notified of an error.

Figure 2:
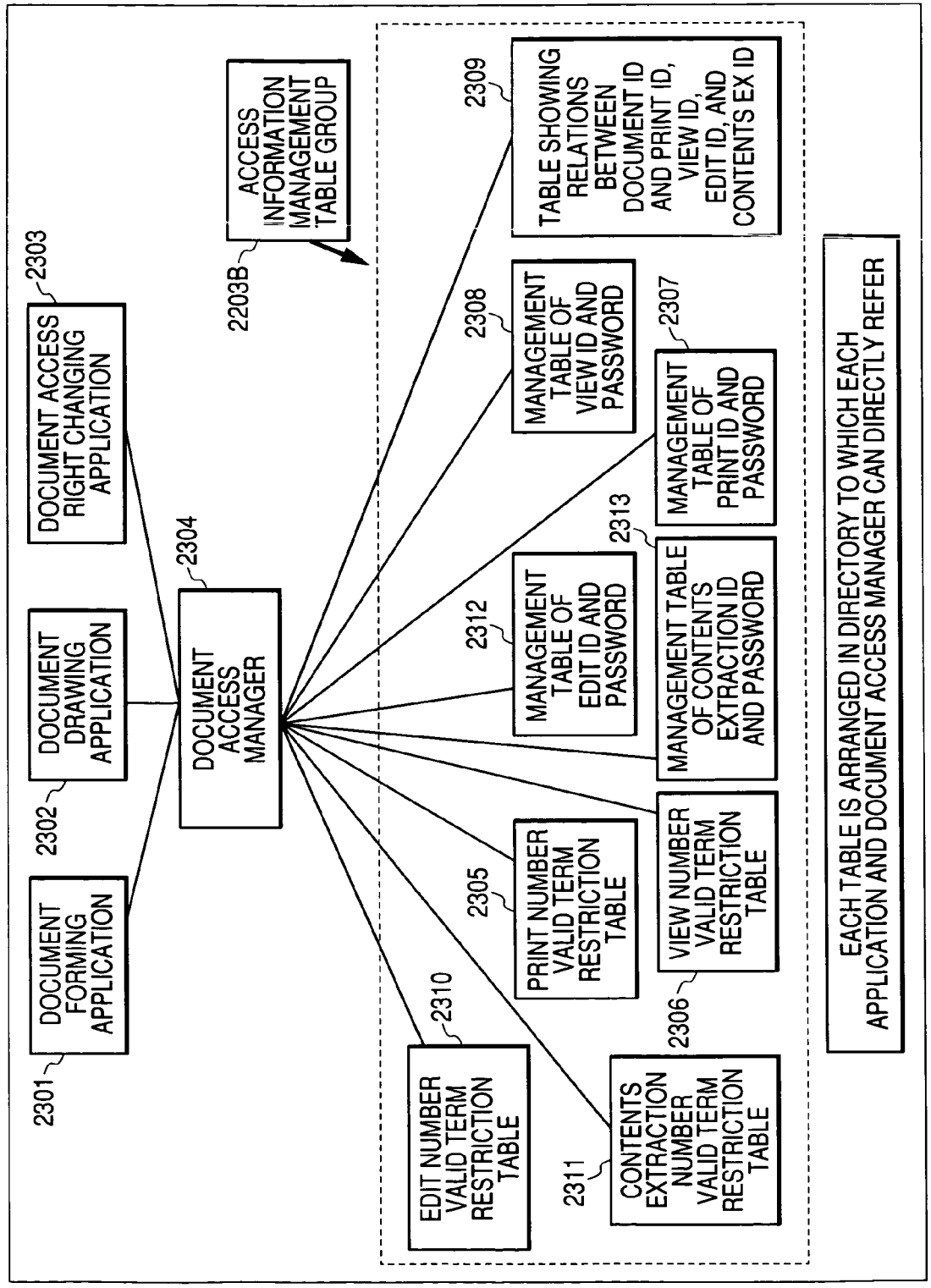
FIG. 2 is a diagram for explaining a correspondence relation between a document access manager and an access information management table in a PC shown in FIG. 1.

FIG. 2 is a diagram for explaining a correspondence relation between a document access manager and the access information management table 2203B in the PC 2201 shown in FIG. 1. The same component elements as those in FIG. 1 are designated by the same reference numerals.

In FIG. 2, reference numeral 2304 denotes a document access manager constructed as a module which is stored in the storing apparatus 2203.

In the embodiment, there are three data processing functions of the operator side such as document forming application 2301, document drawing application 2302, and a document access right changing application 2303. The operations such as creation, drawing, editing, printing, and the like of an ordinary document are executed.

When the permission attributes are based only on a document according to the electronic file, the creation of the document, determination of the attributes, encryption, and the like are executed only by the document forming application 2301.

When the operator wants to enable the permission attributes to be changed by his own instruction, the password of the document and the number of using times of the document are restricted against the document access manager 2304 by using: a management table 2307 of Print ID and the password; a management table 2308 of View ID and the password; a Print number (the number of printing times) valid term restriction table 2305; a View number (the number of browsing times) valid term restriction table 2306; a management table 2312 of Edit ID and the password; a management table 2313 of Contents ExID (extraction ID) and the password; an Edit number (the number of editing times) valid term restriction table 2310; a Contents Ex number (the number of contents extracting times) valid term restriction table 2311; a table 2309 showing relations between Document ID and Print ID, View ID, Edit ID, and Contents ExID; and the like. Those tables are held in the storing apparatus 2203 of the PC 2201.

Figure 3:
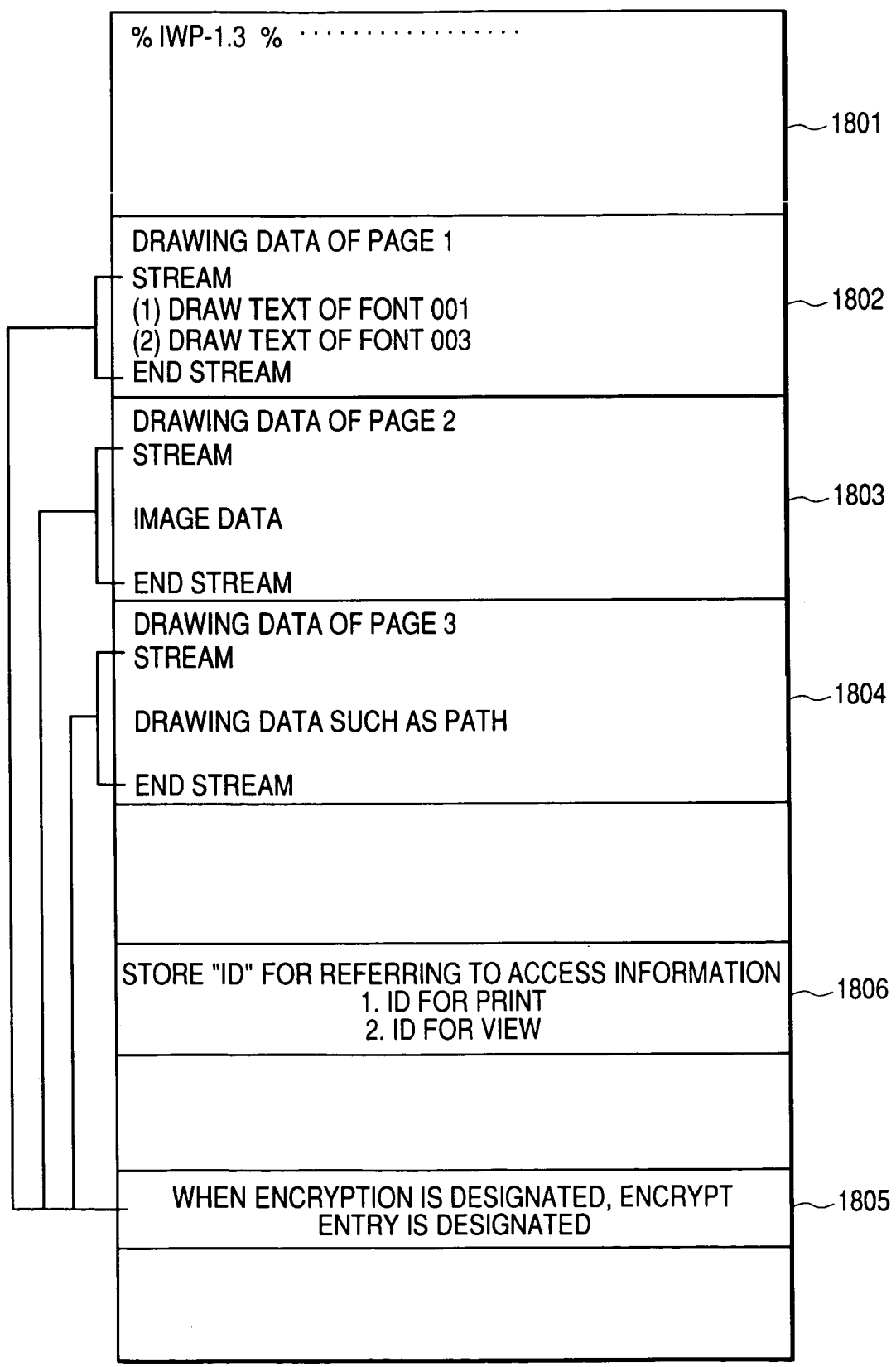
FIG. 3 is a diagram for explaining a structure of a file which is managed in a storing apparatus shown in FIG. 1.

FIG. 3 is a diagram for explaining a structure of a file which is managed in the storing apparatus 2203 shown in FIG. 1. For example, it corresponds to an example of a structure of encryption data of an IWP file. IWP denotes an electronic document formed in accordance with specific format specifications.

A construction of the encrypted IWP file will be described hereinbelow.

First, a specific character string "%IWP-" exists on a head line of a file header 1801. When data starts with this character string, this file is a file which can be drawn by the present software.

In this IWP file, for example, information necessary for drawing a plurality of pages 1802 to 1804 can be confirmed.

A disclosure of an entry 1805 showing whether the IWP file has been encrypted or not is included. In the case of the encrypted IWP file, the "Encrypt entry 1805 is set. When it is set, it shows that a drawing object, image data, and path data in the IWP file have been encrypted by, for example, RC4 and MD5 as encrypting tools.

The drawing data such as drawing object, image data, path data, and the like has been stored in each of the pages 1802 to 1804. An arbitrary number of data can be disclosed in the same page and the order of them is not specified.

Figure 4:
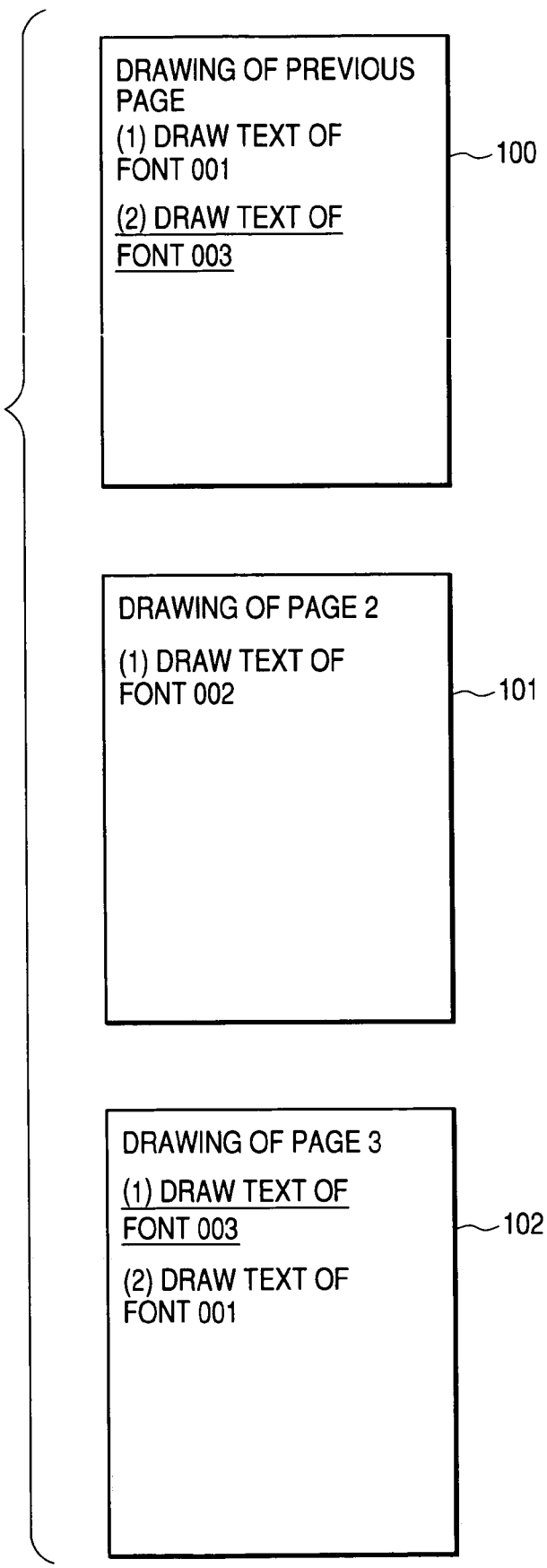
FIG. 4 is a diagram for explaining a text drawing state to each page shown in FIG. 3.

FIG. 4 is a diagram for explaining a text drawing state to each of the pages 1802 to 1804 shown in FIG. 3. In the example shown in FIG. 4, "when the fonts which are used in the pages are the same", a case where the font has been embedded in each of the electronic documents of three pages will be described.

As shown in FIG. 4, a text drawing 100 using the embed fonts of Font001 and Font003 exists at Page 1, a text drawing 101 using the embed font of Font002 exists at Page 2, and a text drawing 102 using the embed fonts of Font003 and Font001 exists at Page 3, respectively.

Figure 5:
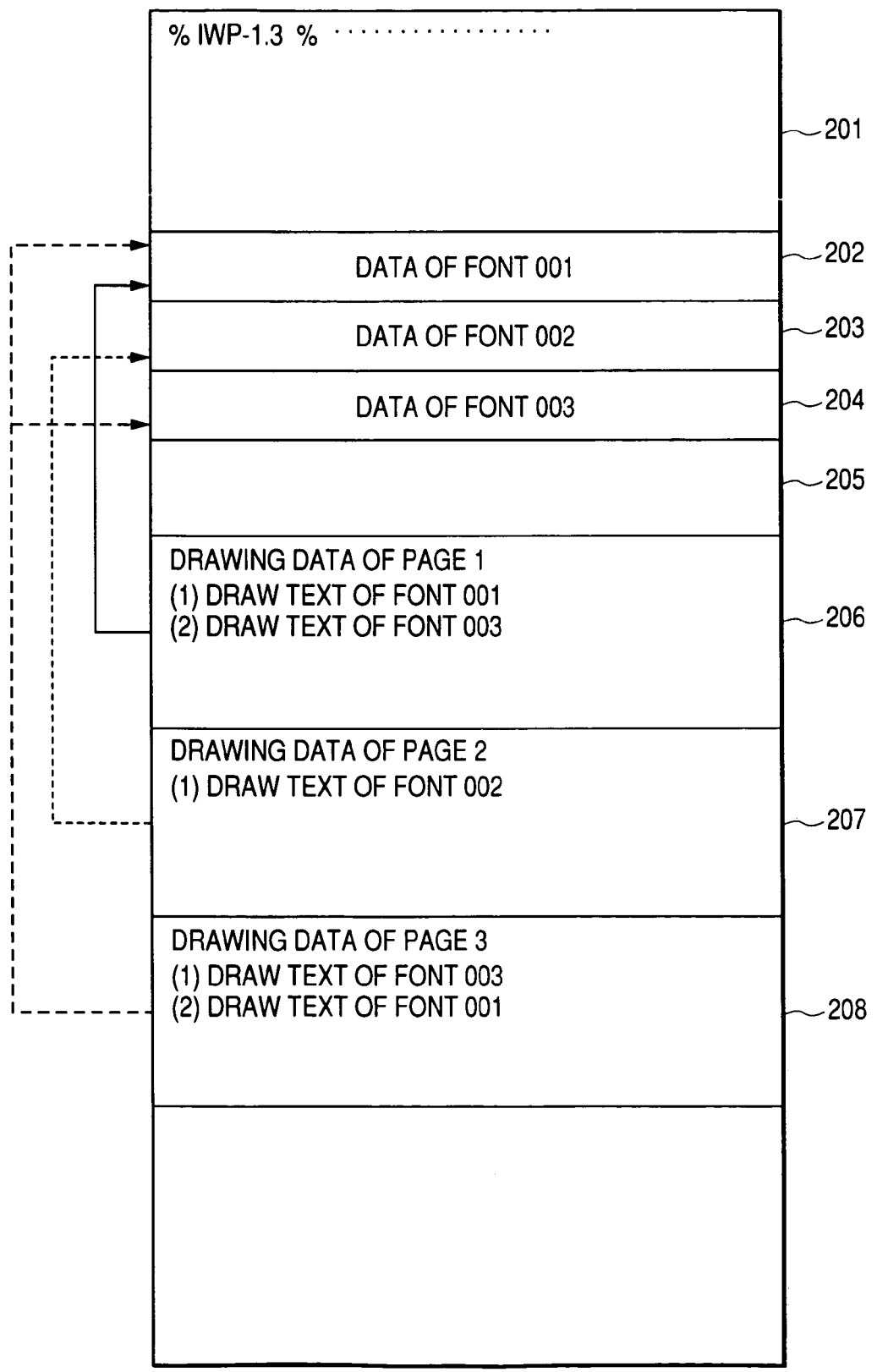
FIG. 5 is a diagram for explaining a structure of a file which is managed in the storing apparatus shown in FIG. 1.

FIG. 5 is a diagram for explaining a structure of a file which is managed in the storing apparatus 2203 shown in FIG. 1. For example, it corresponds to an example of a structure of embed font data of the IWP file for the text drawings 100 to 102 shown in FIG. 4.

In the page drawing data and the assembled (hereinafter, referred to as "embedded" or "embed") font data of the IWP file, a relation between drawing information of the font in the IWP (or PDF) data and embed font information necessary for drawing will be described hereinbelow.

First, a specific character string "%IWP-" exists on a head line of a file header 201. When data starts with this character string, this means that this file is a file which can be drawn by the present software.

In the IWP file shown in FIG. 5, information necessary for drawing a plurality of pages 202 to 205 can be confirmed.

Reference numeral 206 denotes a storing location of the page data 100 shown in FIG. 4 in the IWP file. In this page, two fonts of Font001 and Font003 are embedded.

In the case of drawing these fonts, the font information 202 is referred to as for Font001 and the font information 204 is referred to as for Font003.

Reference numeral 207 denotes a storing location of the page data 101 shown in FIG. 4 in the IWP file. In this page, Font002 is embedded. In the case of drawing this font, the font information 203 is referred to as for Font002.

Reference numeral 208 denotes a storing location of the page data 102 shown in FIG. 4 in the IWP file. In this page, two fonts of Font003 and Font001 are embedded. In the case of drawing these fonts, the font information 202 is referred to as for Font001 and the font information 204 is referred to as for Font003.

As mentioned above, in the case of drawing the same fonts at a plurality of pages, the Font Files which are referred to are constructed as a common file.

In the present application, when the embedded font is drawn, the Font File is formed from the font information as shown in FIG. 5 and after this Font File is registered into the OS, the font is drawn.

For example, although Windows (registered trademark) as one of the OSs in personal computers has many kinds of OSs (Operating Systems) (Windows (registered trademark) 95, Windows (registered trademark) 98, Windows (registered trademark) SE, and Windows (registered trademark) XP), the upper limit numbers of fonts which can be registered are different in dependence on the OSs.

Therefore, a font management table is formed to manage the upper limit number of fonts which can be registered in each OS, avoid the overlapped creation of the Font Files and the wasteful registration of the fonts into the OS, and improve a drawing speed.

FIG. 6 is a diagram showing relations among "Page" in which each font shown in FIG. 5 is used, "Name of file which is registered into OS", and "Name of FONT which is registered into OS".

As shown in FIG. 6, up to N (a value of N can be changed when a program is formed) fonts can be simultaneously registered in each OS.

For example, the font of table No. 1 is used only at Page 1, the name of the Font File which is registered into the OS is "NewDTXDEF+Century1125040100.ttf", and the name of the font which is registered into the OS is "NewDTXDEF+Century1125040100".

A case of drawing Page 1 and subsequently drawing Page 2 will now be considered.

At Page 1, eight Font Files are formed and eight kinds of fonts are drawn. Subsequently, in the case of drawing Page 2, although eleven Font Files are necessary, it is sufficient to form six Font Files which are not formed at Page 1. Thus, a time necessary for forming five files can be omitted.

Figure 7:
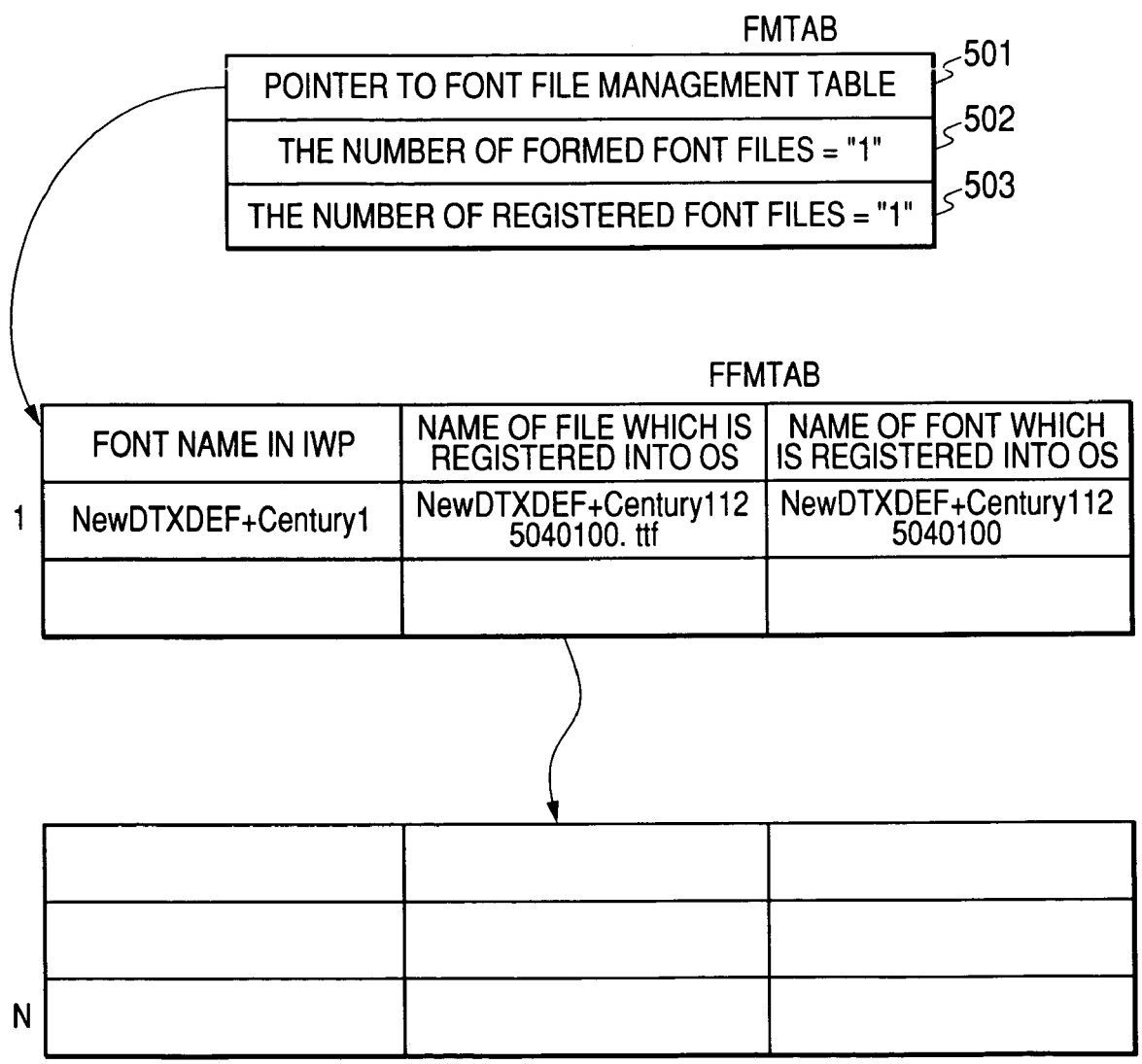
FIG. 7 is a diagram for explaining a registering state of a first Font File management table and a Font management table in the document processing system according to the embodiment.

FIG. 7 is a diagram for explaining a registering state of a first Font File management table and a Font management table in the document processing system according to the embodiment.

A Font management table FMTAB shown in FIG. 7 is constructed by: a pointer 501 to a Font File management table FFMTAB; the number of formed Font Files 502; and the number of registered Font Files 503.

In the case of drawing the first font at the first page, the Font management table FMTAB is first referred to and, subsequently, the Font File management table FFMTAB is referred to from the pointer 501 to the Font File management table.

There are three items "Name of font in IWP", "Name of file which is registered into OS", and "Name of FONT which is registered into OS" in the Font File management table FFMTAB.

A font name different from that of the original font used upon creation of the IWP file is added to the font embedded into the IWP file. This is because although editing such as replacement of the IWP file with another IWP file every page or the like can be performed, since division or coupling cannot be performed every page which is used with respect to the embed font, it is necessary to take a countermeasure for preventing the overlap with the same font used in the other pages upon page editing.

There is a case where a plurality of applications are activated in the same PC and, in this instance, there is a case where the same IWP file is drawn. At this time, if the font used in the IWP file is registered as it is into the OS, the same font is simultaneously registered into the OS. In such a situation, there is a possibility that a problem such as illegal process of the application, crush of the OS, or the like is caused.

Therefore, the name of the font which is registered into the OS is changed to a name which is different from the font name in the IWP file. A font which is newly registered into the OS needs to be certainly registered into the Font File management table FFMTAB.

Figure 8:
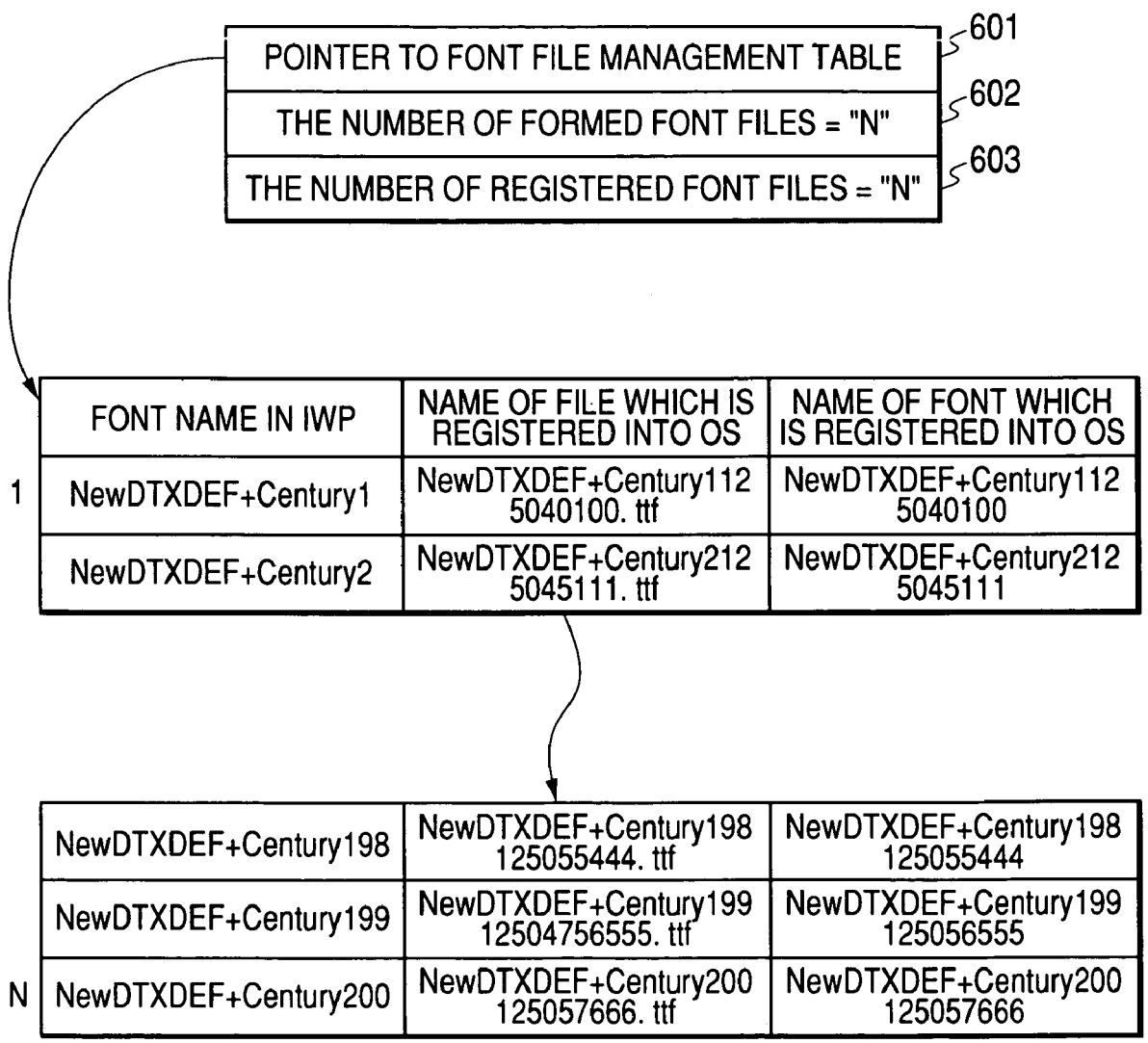
FIG. 8 is a diagram for explaining a registering state of a second Font File management table and the Font management table in the document processing system according to the embodiment.

FIG. 8 is a diagram for explaining a registering state of a second Font File management table and the Font management table in the document processing system according to the embodiment. The state where the number of files which are registered into the OS becomes equal to N (maximum value) is shown.

The Font management table FMTAB shown in FIG. 8 is constructed by: a pointer 601 to the Font File management table FFMTAB; the number of formed Font Files 602; and the number of registered Font Files 603.

At this time, for example, as shown in FIG. 9, when 201 kinds of embed fonts are used per page, since this value exceeds the maximum value of the registration table, the 201st font cannot be drawn.

Figure 10:
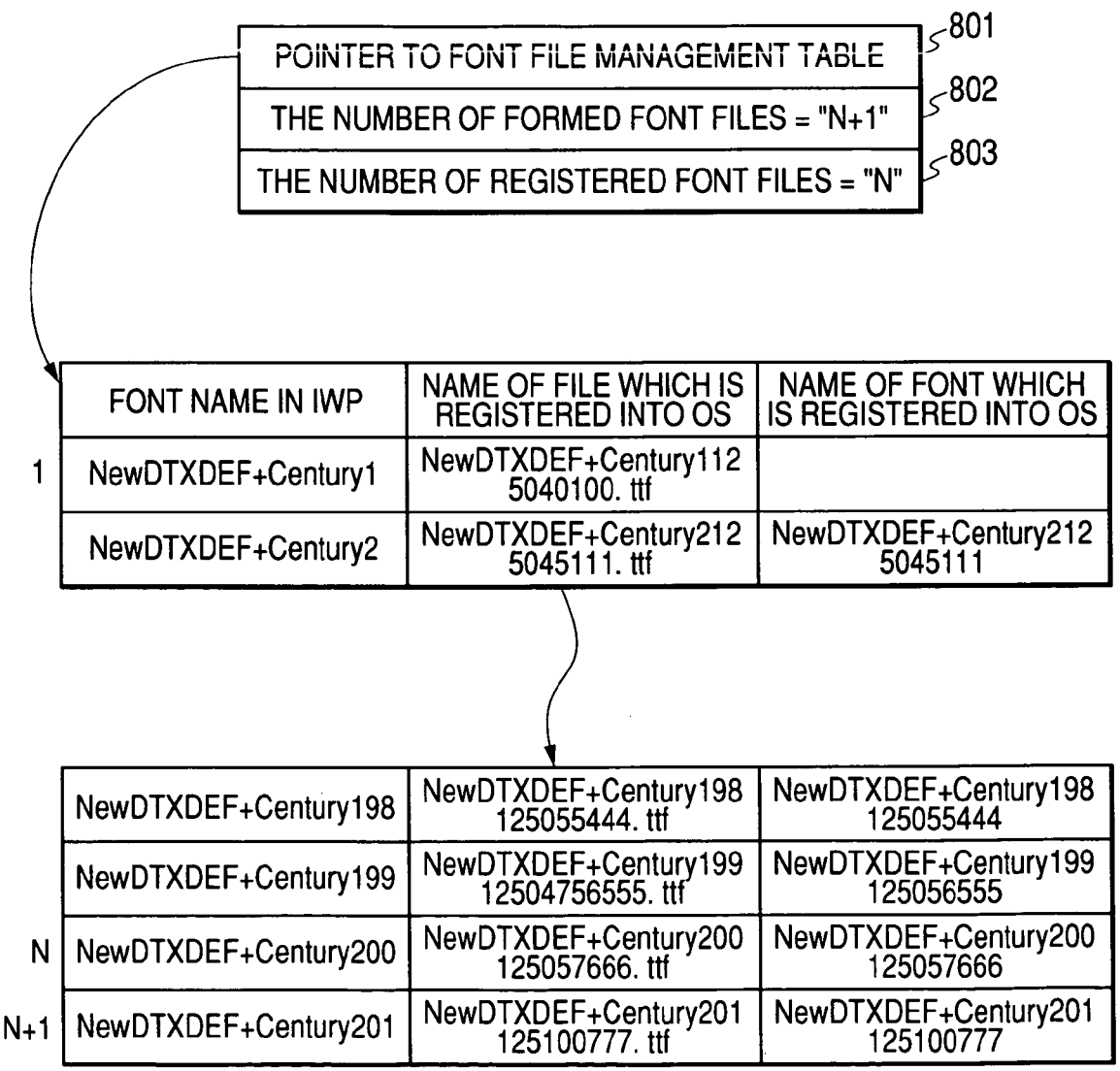
FIG. 10 is a diagram for explaining a registering state of a third Font File management table and the Font management table in the document processing system according to the embodiment.

FIG. 10 is a diagram for explaining a registering state of a third Font File management table and the Font management table in the document processing system according to the embodiment. As shown in FIG. 9, it corresponds to a case of using 200 or more embed fonts. The drawing of the 201st embed font will be described hereinbelow.

As shown in FIG. 10, when "The number of registered Font Files" in the "Font management table" is equal to N (maximum value), new embed font information is registered in the 201st location in the "Font File management table".

Subsequently, the font registration in the OS is cancelled with respect to the oldest font and "Name of FONT which is registered into OS" in the "Font File management table" is deleted.

At this point of time, "The number of registered Font Files" is equal to 199.

Lastly, the font registered in the 201st location in the "Font File management table" is registered into the OS and the font name is written into "Name of FONT which is registered into OS".

Figure 37:
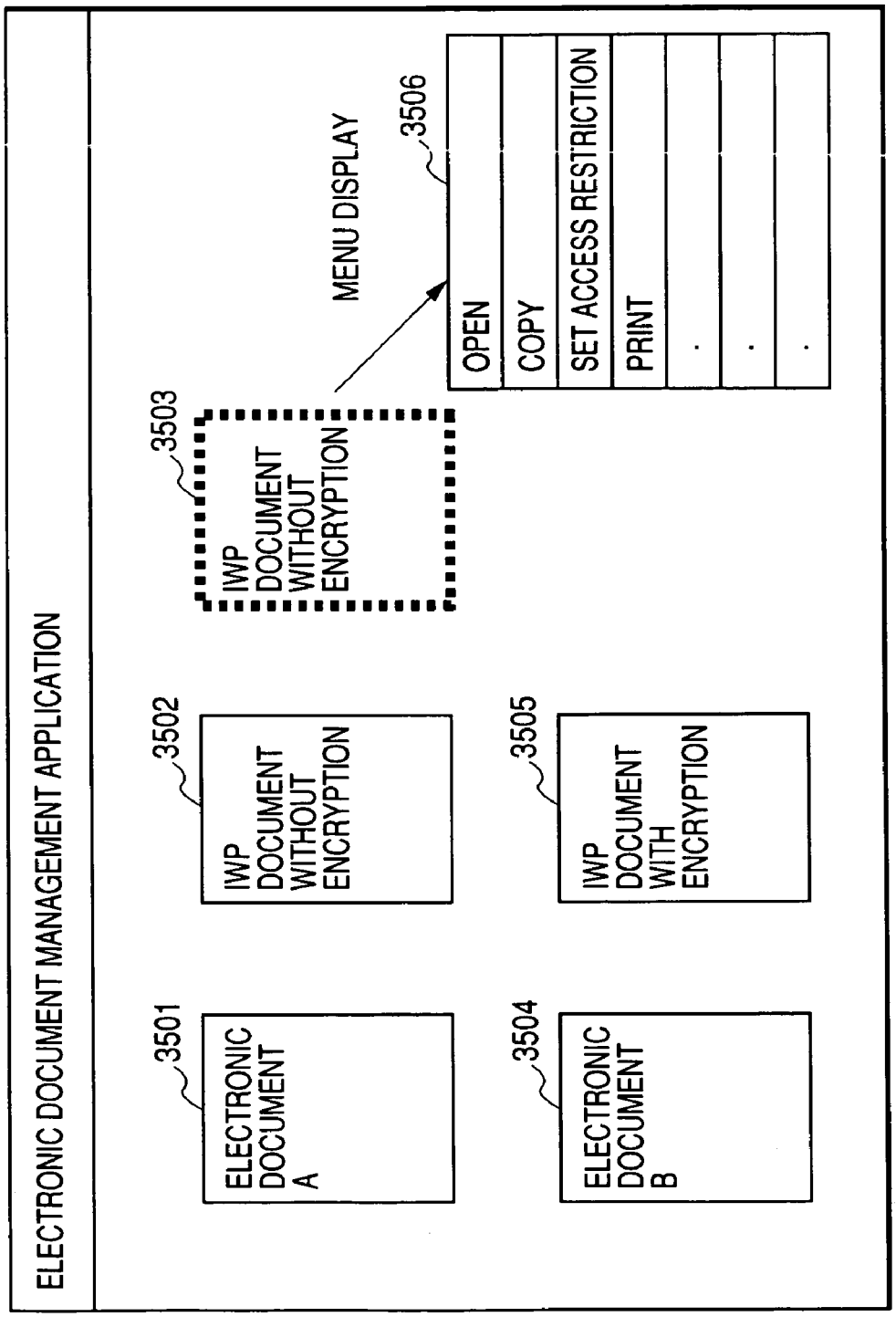
FIG. 37 shows a UI for an electronic document management application according to the embodiment.

FIG. 37 is a flowchart showing an example of a data processing procedure in the document processing system according to the embodiment and corresponds to a user interface (UI) for the document processing system and its operating method.

The document processing system has a user interface in a form "electronic document management application". This application can handle electronic documents in a plurality of data formats.

An electronic document A is in an electronic document format of, for example, Windows (3501). An electronic document B indicates, for example, an image or text document (3504).

Further, an IWP document without encryption (3502) and an IWP document with encryption (3505) can be handled.

When the operator sets the access right or prints with respect to an IWP document without encryption (3503), there is a method of clicking the right button of a mouse and displaying a menu (3506) as one means. The operator selects an arbitrary operation from the displayed menu.

Figure 38:
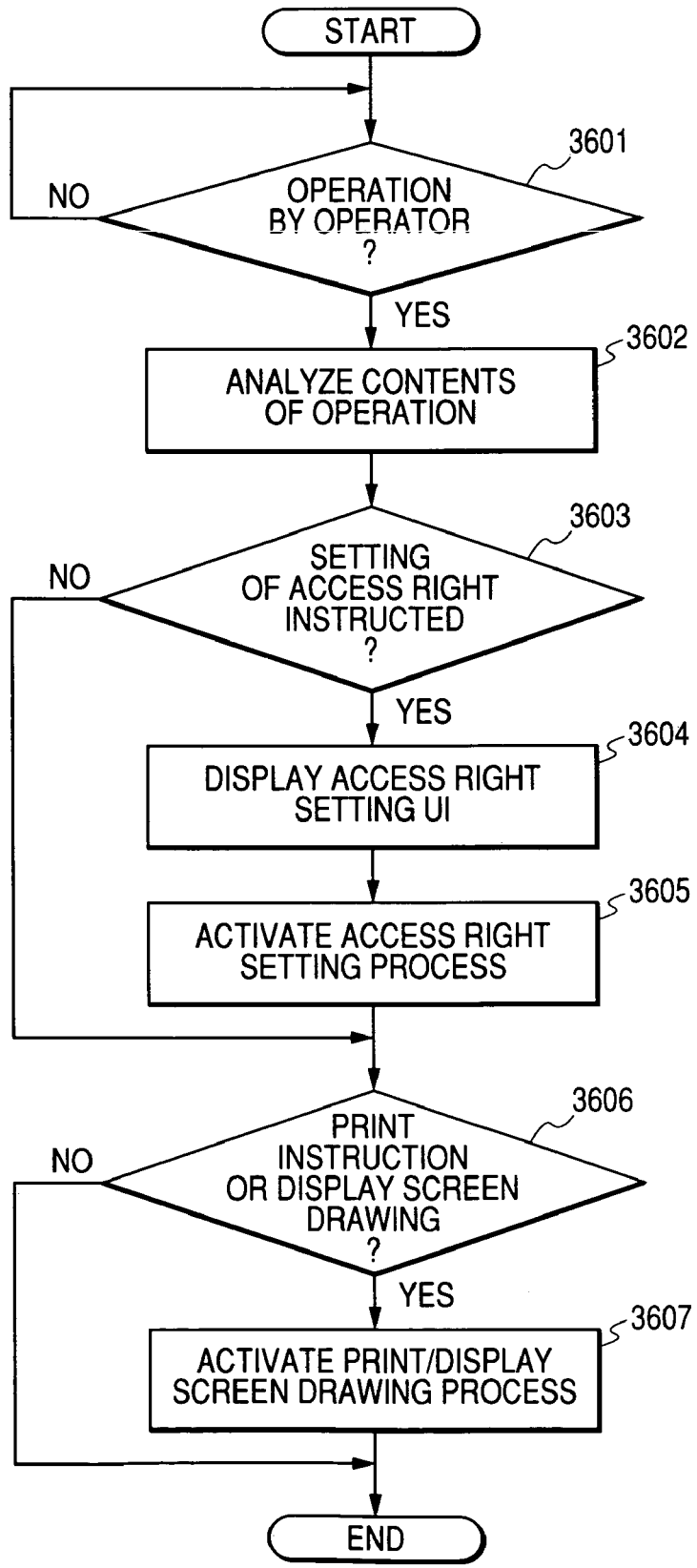
FIG. 38 is a flowchart showing an example of a processing procedure of an upper application according to the embodiment.

FIG. 38 is a diagram for explaining a flow which is activated by the foregoing operation of the operator and shows an analysis of the operation of the operator and processes which are executed in accordance with contents of the operation.

According to this flow, the system is ordinarily in the state where the operation of the user is constantly waited in step (3601). When the operation is executed by the operator, a process to analyze the operation contents is executed (3602).

This analysis is executed on the basis of information which is sent from the Windows OS.

An analysis result is discriminated (3603). When the analysis result indicates an access right setting instruction, an access right setting UI, which will be explained hereinlater, is displayed (3604). When the access right is set by the UI, an access right setting operation, which will be explained hereinlater, is activated (3605). When the analysis result does not indicate the access right setting instruction in (3603), the next process follows. When the analysis result indicates a print instruction or drawing on a display screen (3606), a print/display screen drawing process is activated (3607). If it does not indicate the print instruction or the drawing on the display screen, the processing routine is finished as it is.

Figure 39:
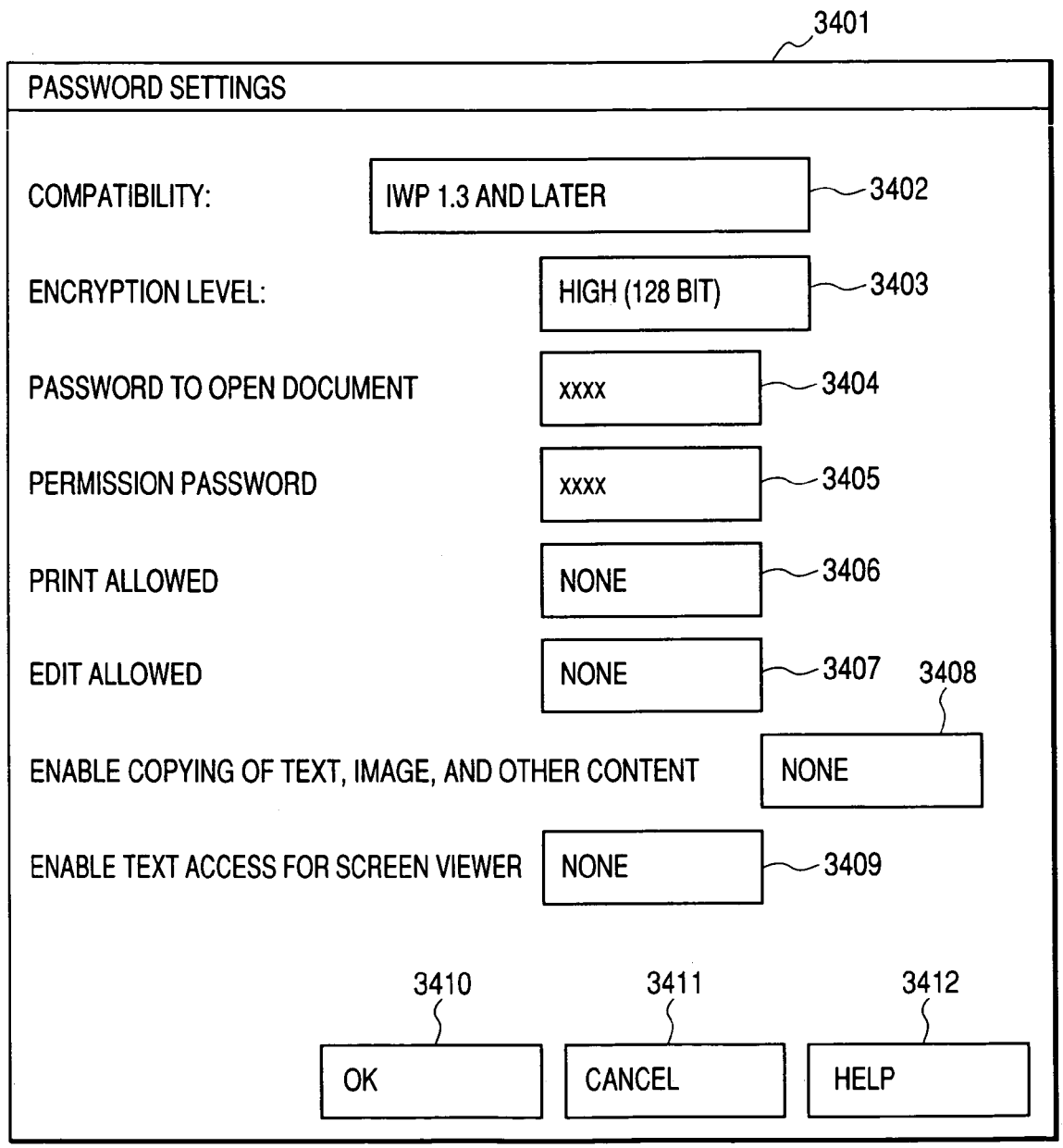
FIG. 39 shows a selecting UI for an encryption type which is set into the electronic document according to the embodiment.

FIG. 39 shows an example explaining a display screen of the access right setting UI (3401).

Since the IWP file has a plurality of versions, the version can be selected in order to keep compatibility with other systems in "Compatibility" (3402).

The IWP file supports an encrypting function. The operator can select EncryptionLevel (encryption key lengths) of 40 bits and 128 bits by encryption using standard encrypting algorithms RC4 and MD5 (3403).

In the IWP file, two kinds of passwords are supported. One of them is "Password to Open Document" and corresponds to a "U" password, which will be explained hereinafter (3404). This password is used for opening the file.

The other is "Permission Password" and corresponds to an "O" password, which will be explained hereinafter (3405). This password has a right for changing the access right of the IWP file. When the operator wants to restrict the printing of the IWP file, "None" is set by "PrintAllowed" (3406). When the operator wants to restrict the editing of the IWP file, "None" is set by "EditAllowed" (3407).

When the operator wants to restrict the extraction of the contents of the IWP file, "None" is set by "Enable Copying of Text, Image, and Other Content" (3408). When the operator wants to restrict use by an external device of a text in the IWP file, "None" is set by "Enable Text" (3409).

Figure 11:
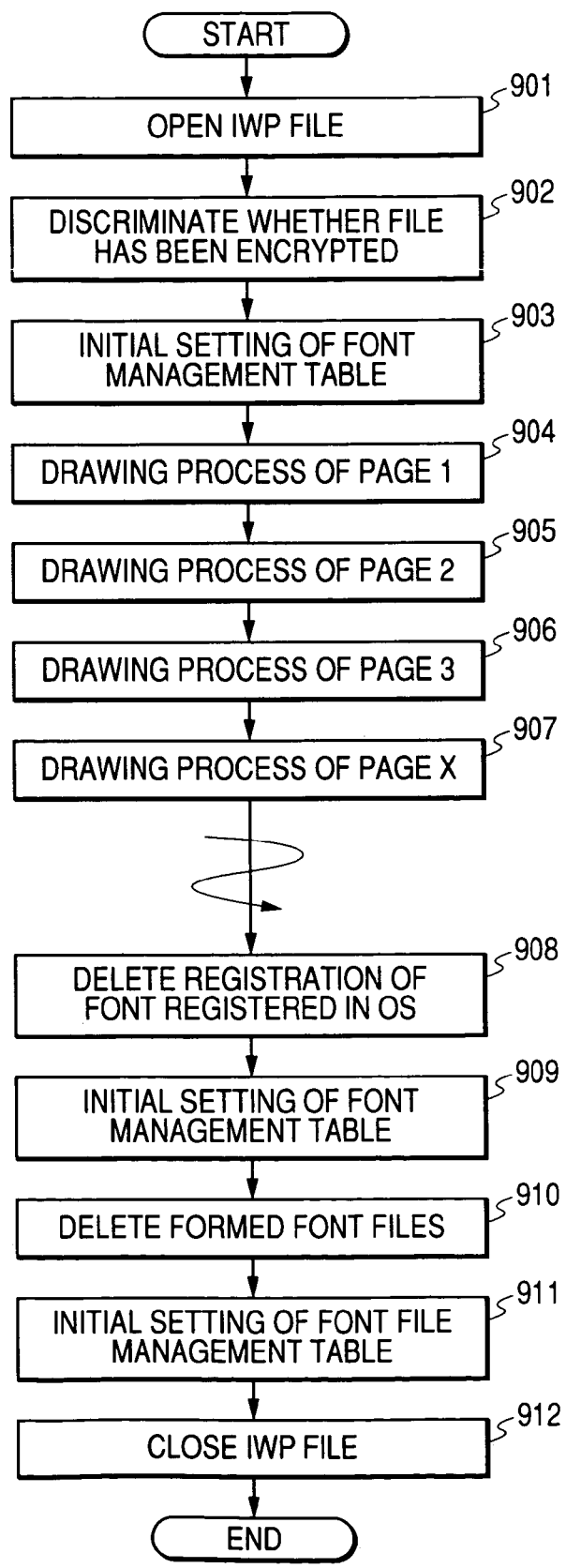
FIG. 11 is a flowchart showing an example of a data processing procedure in the document processing system according to the embodiment.

FIG. 11 is a flowchart showing an example of the data processing procedure in the document processing system according to the embodiment and corresponds to, for example, a drawing processing procedure of the IWP file. Reference numerals (901) to (912) denote processing steps.

The processes according to this software (program) are an application for drawing the IWP file designated by an upper application.

When the drawing of the IWP file is instructed by the upper application, a processing routine based on the present application is activated. The whole flow is disclosed in this flowchart and detailed processes in respective items will be described in FIG. 19 and subsequent diagrams.

First, the designated IWP file (IWPFile) is opened (901). At this time, when it cannot be opened, an error process is necessary separately and an error is returned to the upper application. In this instance, the operator is notified of an error type.

When the IWP file can be opened, whether the file has been encrypted or not is discriminated (902).

Initial settings of the Font management table and the Font File management table are performed (903).

Subsequently, the drawing process of Page 1 is executed (904), the drawing process of Page 2 is executed (905), the drawing process of Page 3 is executed (906), and finally, the drawing process of Page X is executed (907).

Details of the drawing process of each page will be explained in FIG. 12 and subsequent diagrams.

In the present software, although the font extracted from the IWP file is registered into the OS in order to draw the embed font, it is necessary to delete this registration when the drawing process is finished (908).

At this time, the registration of all fonts registered in the OS in order to use in the page layout is also deleted.

After completion of the deletion of the registration of the fonts into the OS, the Font management table is initialized (909). All of the Font Files used for the page layout formed in a temporary work area are deleted (910) and the Font File management table is initialized (911).

Finally, the IWP file is closed (912) and the processing routine is finished.

The process in step (902) in the case where the file has been encrypted will now be described.

Figure 12:
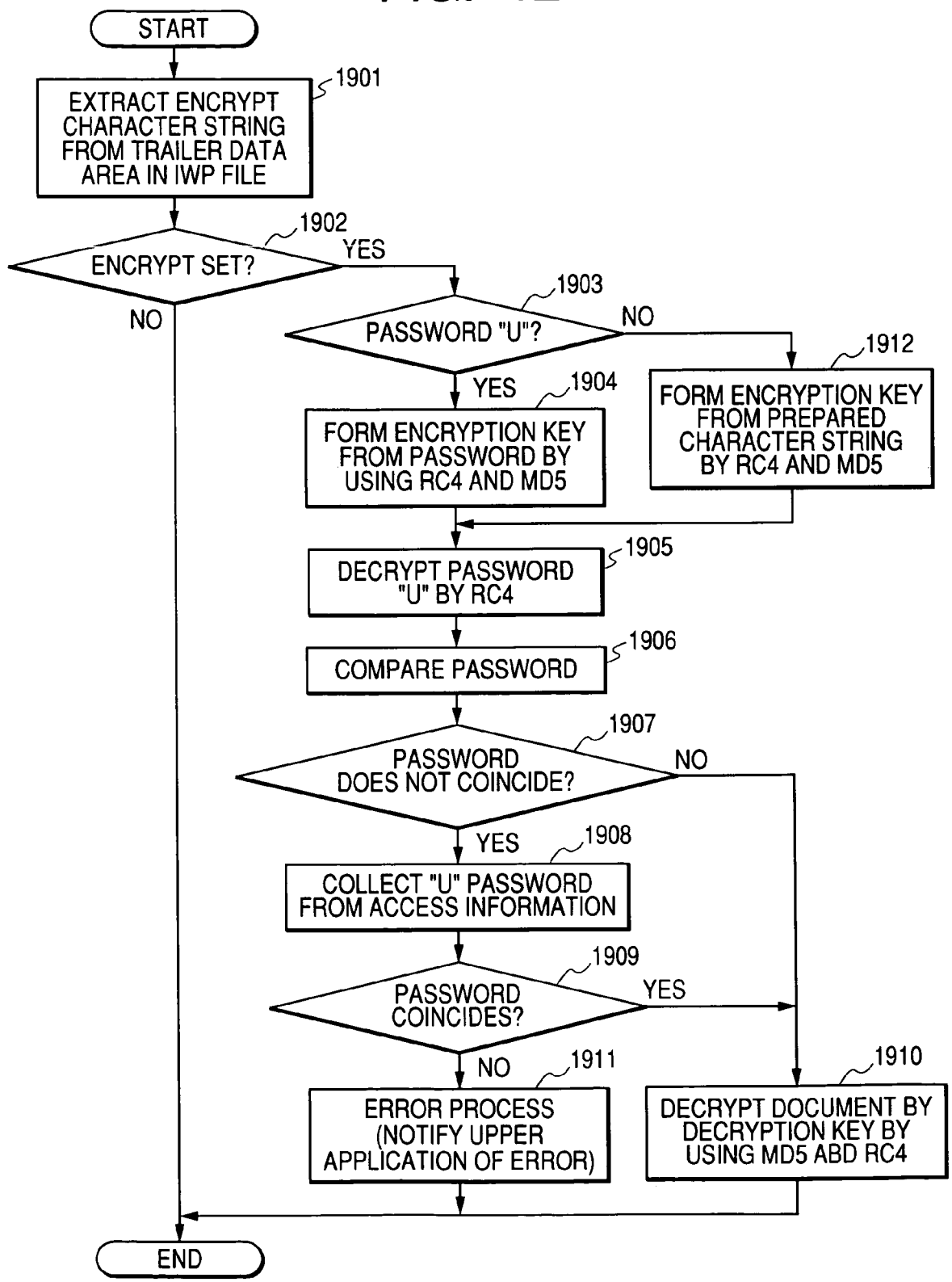
FIG. 12 is a flowchart showing an example of the data processing procedure in the document processing system according to the embodiment.

FIG. 12 is a flowchart showing an example of the data processing procedure in the document processing system according to the embodiment and corresponds to a detailed procedure in step (902) shown in FIG. 11. Reference numerals (1901) to (1911) denote processing steps.

First, a process of "the Encrypt character string is extracted from a Trailer data area of the IWP file" is executed (1901).

In this instance, whether "Encrypt" has been set or not is discriminated (1902). If it is determined that the Encrypt character string could be retrieved, the processing routine advances to step (1903). If it is determined that the file is not encrypted, since the processing routine advances to the next page drawing process as it is, the processing routine is finished.

The user password "U" can be preset into the IWP file in order to set the permission to open the file. If the password "U" has been set, it is necessary to form a password equivalent to the user password stored in the IWP file and perform decryption. If it is not set, an encryption key is formed from the character string which has previously been designated and a decrypting process of the IWP file can be executed by using this key.

Whether the password "U" has been set or not is discriminated (1903). When it is determined that the password "U" has been set, if the password has been designated by the upper application, a process for forming the encryption key by using the character string is executed (1904).

If it is determined in step (1903) that the password is not set, the encryption key is formed by using the predetermined character string (1912) and step (1905) follows.

At this time, when the password designated by the upper application is shorter than 32 bytes, insufficient bytes from the head of the character string are added to the password.

Subsequently, the password "U" set in the IWP file is decrypted by RC4 (1905).

The password which has been extracted from the IWP file and decrypted is compared with the predetermined character string (1906). Whether the password does not coincide with it or not is discriminated (1907). If it is determined that they coincide (NO in step 1907), it is decided that the correct password has been set. The character strings of the whole document are decrypted by using MD5 and RC4 as mentioned above (1910). The processing routine is finished.

If it is determined in step (1907) that the password does not coincide, the document access manager 2304 is instructed to collect the "U" password (1908).

Whether the collected "U" password coincides or not is discriminated (1909). If it is determined that the password does not coincide (NO in step 1909), to execute a process for notifying the upper application of such a fact, it is notified of an OPEN error of the file and an error code (1911) and the processing routine is finished.

If it is determined in step (1909) that they coincide, it is decided that the correct password has been set. The character strings of the whole document are decrypted by using MD5 and RC4 as mentioned above (1910). The processing routine is finished.

Figure 13:
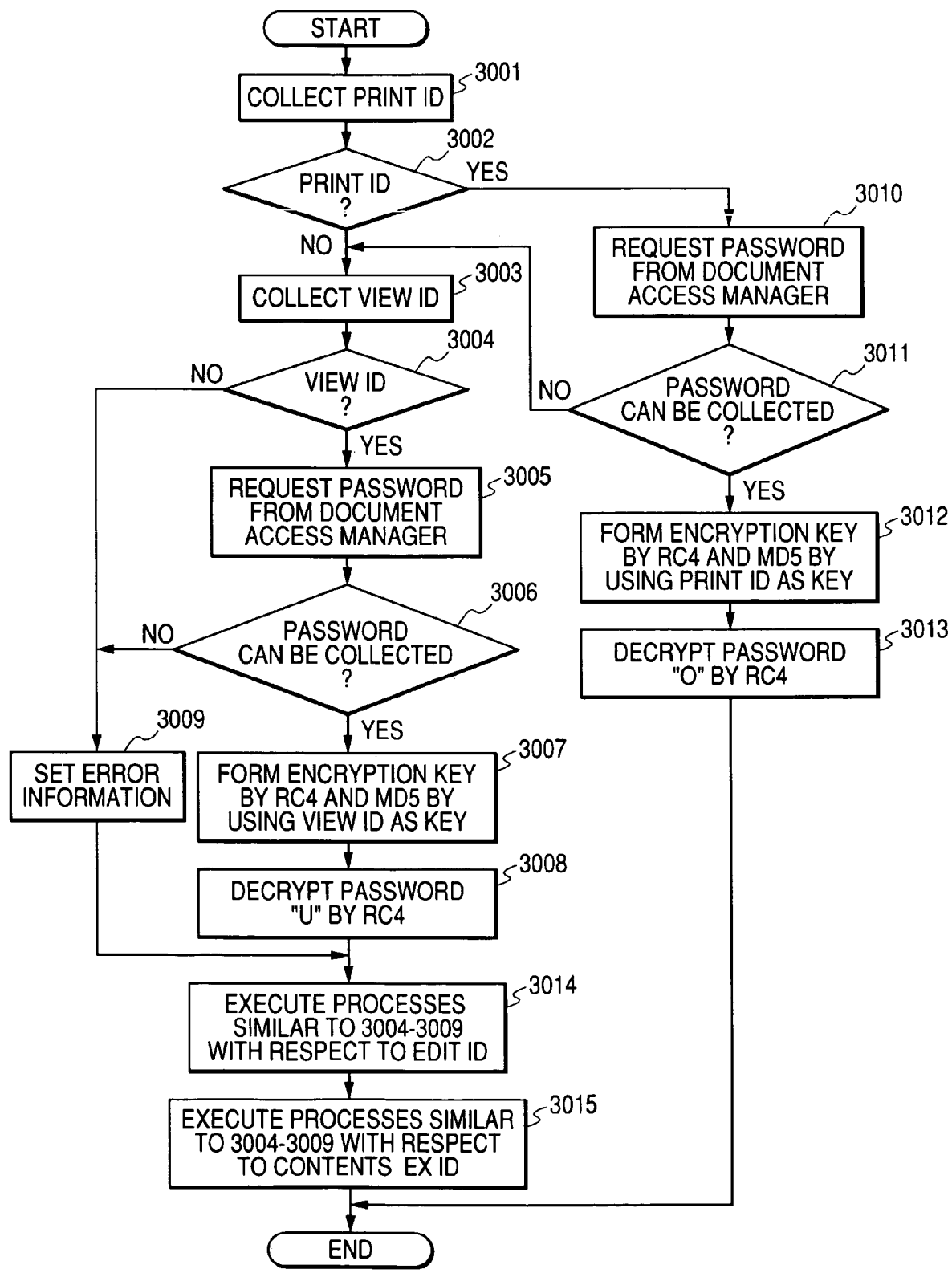
FIG. 13 is a flowchart showing an example of the data processing procedure in the document processing system according to the embodiment.

FIG. 13 is a flowchart showing an example of the data processing procedure in the document processing system according to the embodiment and corresponds to a detailed procedure (processing procedure for collecting the "U" password from the access information) in step (1908) shown in FIG. 12. Reference numerals (3001) to (3013) denote processing steps.

When the process for collecting the "U" password from the access information is activated in step (1908) described in FIG. 12, Print ID and View ID are collected from an ID (1806) for referring to the access information set in the electronic document (IWP) file.

First, Print ID is collected (3001) and whether Print ID has been designated or not is discriminated (3002). If it is determined that Print ID has been designated, Print ID is sent to the document access manager and the password is requested (3010). Whether the password can be collected or not is discriminated (3011). If it is determined that the password can be collected, an encryption key is formed by using MD5 and RC4 by using Print ID as a key (3012). The password "O" is decrypted by RC4 on the basis of the encryption key (3013). The processing routine is finished.

If it is determined in step (3011) that the password cannot be collected, View ID is collected (3003). Whether View ID has been designated or not is discriminated (3004). If it is determined that View ID has been designated, View ID is sent to the document access manager 2304 and the password is requested (3005).

Whether the password can be collected or not is discriminated (3006). If it is determined that the password can be collected, an encryption key is formed by using MD5 and RC4 by using View ID as a key (3007). The password "U" is decrypted by RC4 on the basis of the encryption key (3008). The processing routine advances to the next process (3014).

If it is determined in step (3006) that the password cannot be collected or if it is determined in step (3004) that View ID cannot be collected, the processing routine advances to the next process (3014).

Processes similar to those in steps 3004 to 3009 are executed with respect to Edit ID (3014).

Processes similar to those in steps 3004 to 3009 are executed with respect to Contents ExID (3015).

Figure 14:
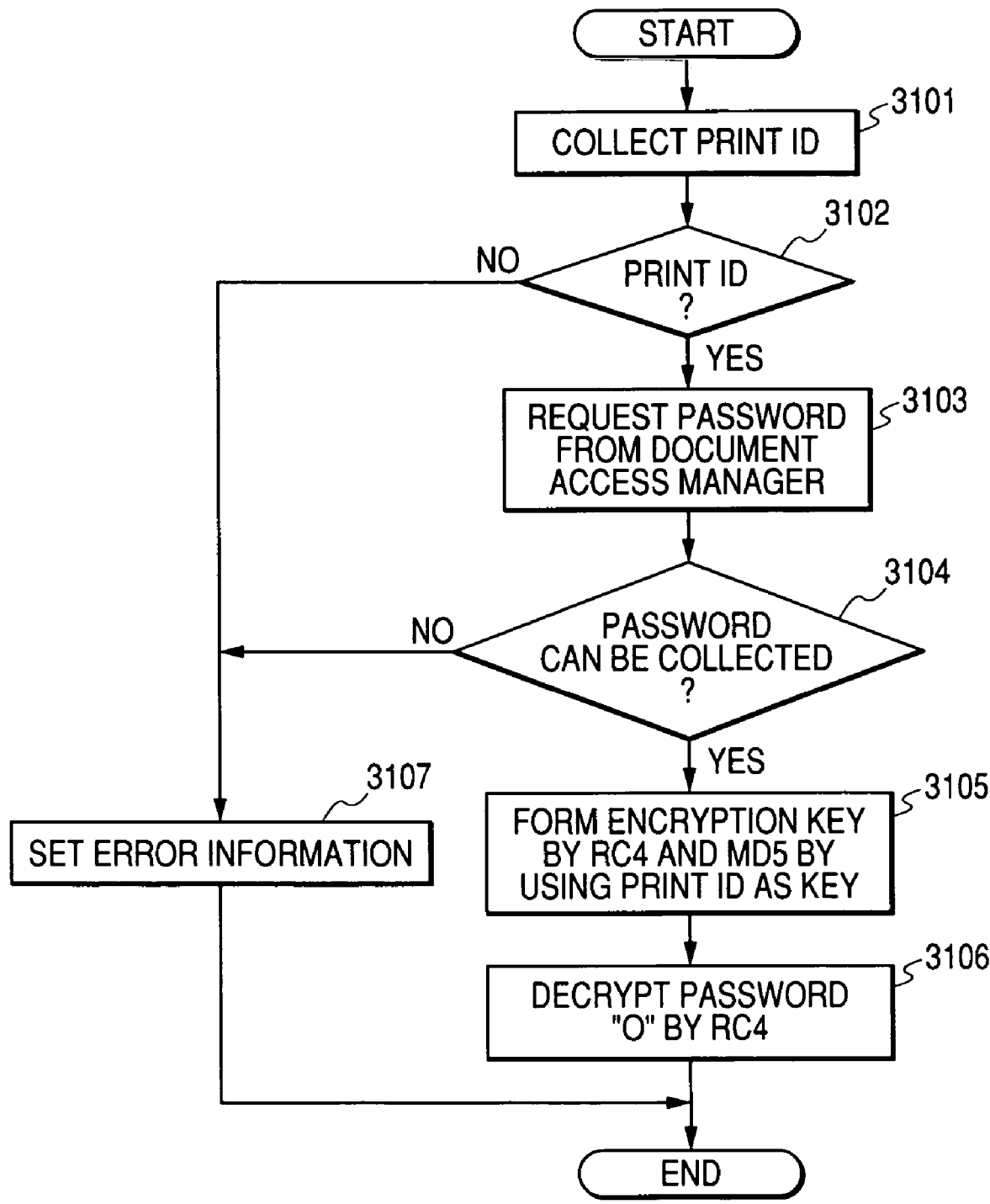
FIG. 14 is a flowchart showing an example of the data processing procedure in the document processing system according to the embodiment.

FIG. 14 is a flowchart showing an example of the data processing procedure in the document processing system according to the embodiment and corresponds to a processing procedure for collecting the "O" password from the access information, which will be explained hereinafter. Reference numerals (3101) to (3107) denote processing steps.

When the process for collecting the "O" password from the access information is activated in step (2007) in FIG. 16, which will be explained hereinafter, Print ID is collected from the ID (1806) for referring to the access information set in the electronic document (IWP) file.

First, Print ID is collected (3101) and whether Print ID has been designated or not is discriminated (3102). If it is determined that Print ID has been designated, Print ID is sent to the document access manager and the password is requested (3103).

Whether the password can be collected or not is discriminated (3104). If it is determined that the password can be collected, an encryption key is formed by using MD5 and RC4 by using Print ID as a key (3105). The password "O" is decrypted by RC4 on the basis of the encryption key (3106). The processing routine is finished.

If it is determined in step (3102) that Print ID is not designated or if it is decided in step (3104) that the password cannot be collected, error information is set (3107) and the processing routine is finished. Subsequently, initial setting of the Font management table shown in FIG. 10 is performed.

An initial setting process of the Font File management table in a process for deciding the maximum value in the Font management table will be explained hereinafter with reference to FIG. 29.

Figure 15:
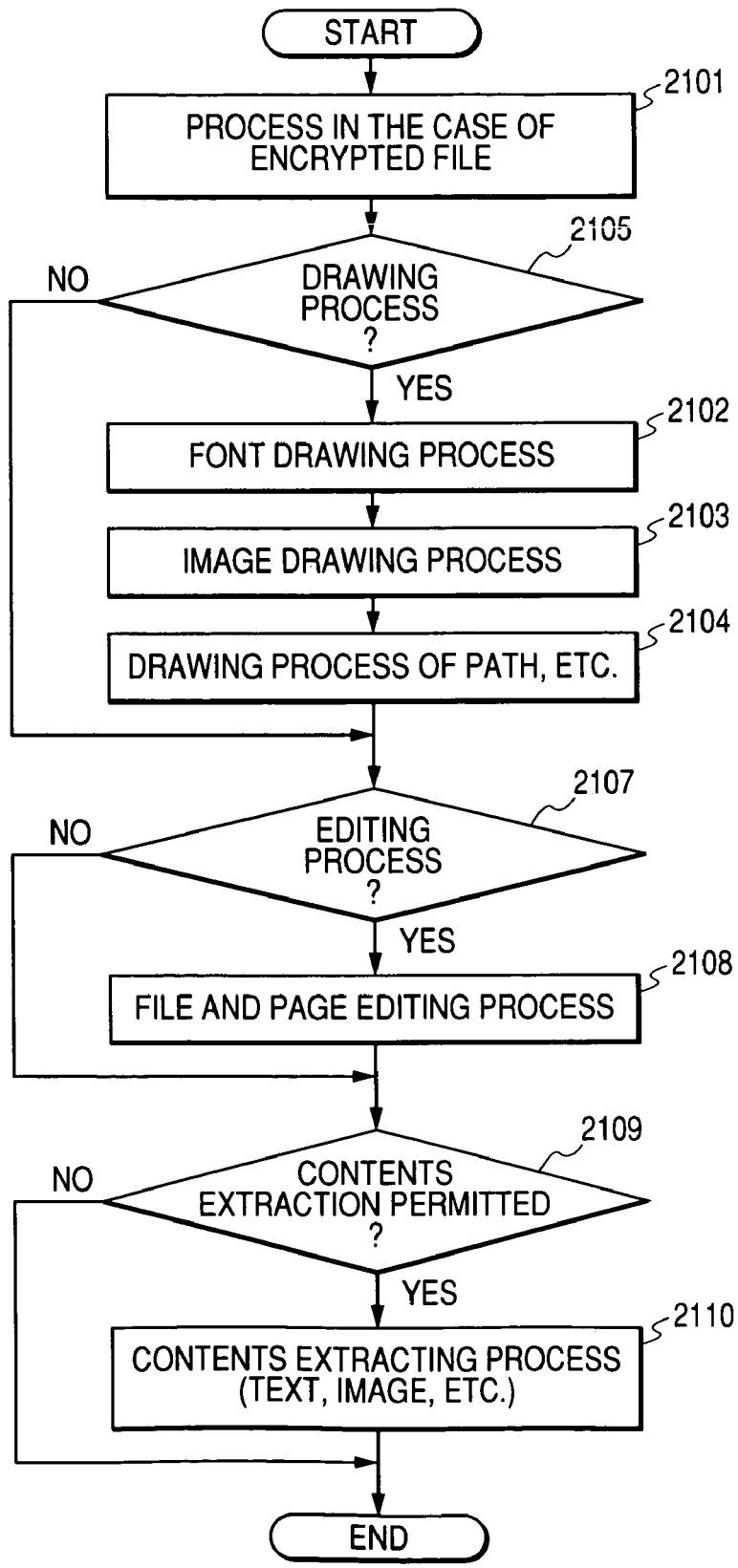
FIG. 15 is a flowchart showing an example of the data processing procedure in the document processing system according to the embodiment.

FIG. 15 is a flowchart showing an example of the data processing procedure in the document processing system according to the embodiment and corresponds to a procedure for a drawing process of one page. Reference numerals (2101) to (2110) denote processing steps.

First, a process in the case where the file has been encrypted, which will be explained in detail hereinafter, is executed (2101). Whether the process is the drawing process or not is discriminated (2105). If it is the drawing process, the process for drawing onto a display screen (GDI) in (2102) is executed. If it is not the drawing process, a discriminating process in (2107) is executed. Drawing processes of a font, an image, a path, and the like are executed to the IWP file (2102 to 2104). Subsequently, whether the process is the editing process or not is discriminated (2107). If it is the editing process, a process in (2108) follows and a process for a file access, page editing, or the like is executed. If it is not the editing process, a discriminating process in (2109) is executed. In the case of a Contents extracting process, a process in (2110) follows and a process such as text extraction, image extraction, or the like is executed. If the process is not the Contents extracting process, the processing routine is finished. If the file has been encrypted in step (2101) and the printing is not permitted, whether the printing is executed at a resolution of a display screen or not can be selected.

A printing process in the case where the file has been encrypted in step (2101) shown in FIG. 15 will now be described.

Figure 16:
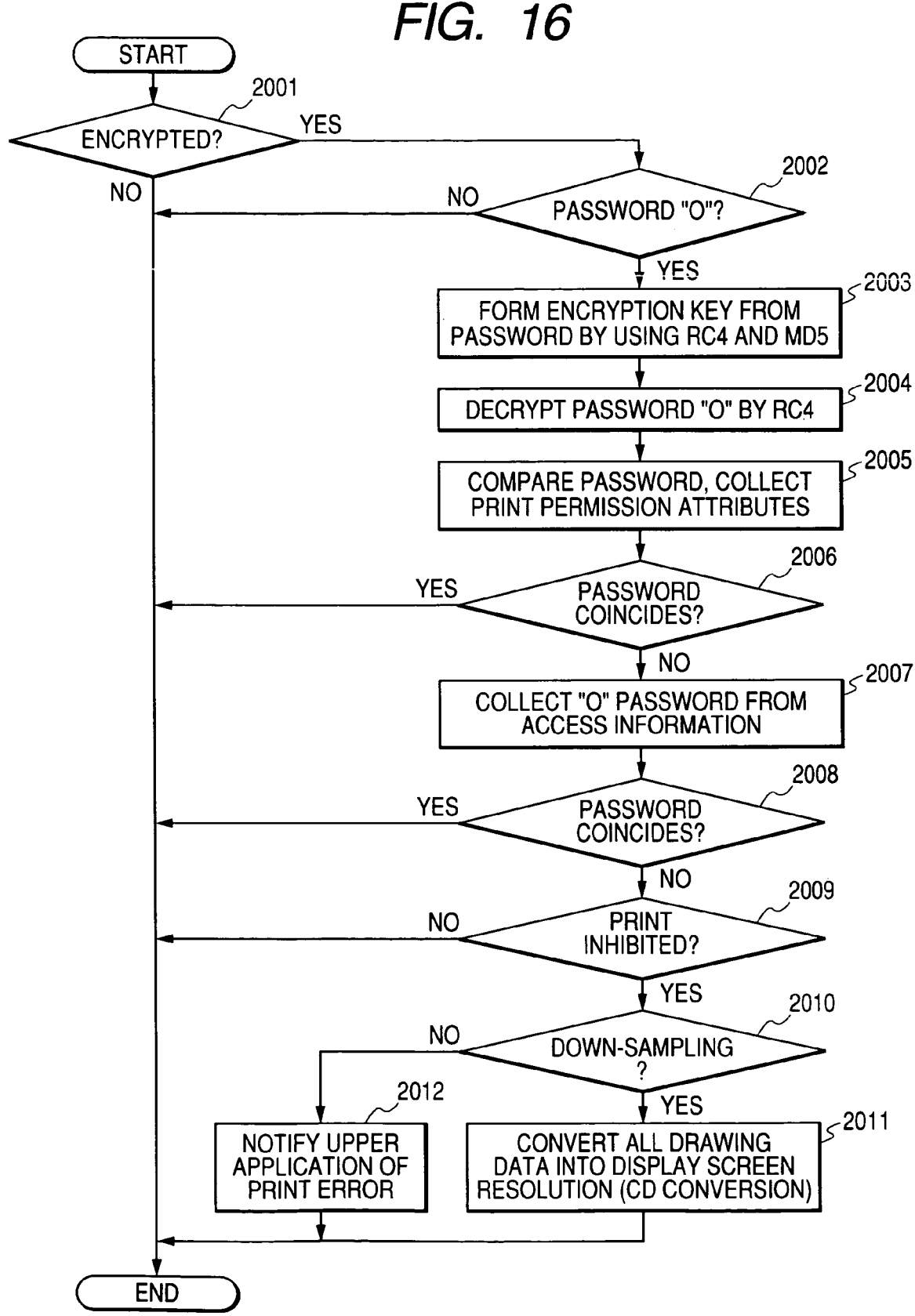
FIG. 16 is a flowchart showing an example of the data processing procedure in the document processing system according to the embodiment.

FIG. 16 is a flowchart showing an example of the data processing procedure in the document processing system according to the embodiment and corresponds to a print resolution conversion processing procedure in the case where the IWP file has been encrypted. Reference numerals (2001) to (2012) denote processing steps.

In a manner similar to step (1902) shown in FIG. 12, whether the IWP file has been encrypted or not is discriminated (2001).

If the file is an ordinary IWP file, since it is not encrypted, the processing routine is finished and advances to step (2102) shown in FIG. 15 and the drawing process is executed as it is.

The owner password "O" can be preset into the IWP file in order to set permission of the file printing, editing, or the like.

Therefore, if it is decided in step (2001) that the IWP file has been encrypted, whether the owner password "O" has been set into the IWP file or not is further discriminated (2002). If it is determined that the owner password "O" is not set into the IWP file, the processing routine is finished in order to execute the ordinary printing process.

If it is determined in step (2002) that the owner password "O" has been set, it is necessary to decrypt the owner password stored in the IWP file.

Therefore, when it is determined that the password "O" has been set, if the password has previously been designated by the upper application or if the "U" user password has been designated, a forming process of an encryption key is executed by using such a password (2003).

At this time, when the password is shorter than 32 bytes, insufficient bytes from the head of the character string are added to the password.

When the owner password designated by the upper application exists, the forming process of an encryption key is executed by using the character string.

Subsequently, the owner password "O" set in the IWP file is decrypted by RC4 (2004). The password which has been extracted from the IWP file and decrypted is compared with the predetermined character string (2005). Whether they coincide or not is discriminated (2006). If it is determined that they coincide, it is decided that the correct password has been set. The processing routine is finished and the ordinary printing process is executed. This is because all operations of the owner of the owner password are permitted.

If it is determined in step (2006) that the password does not coincide, the document access manager is instructed to collect the "O" password in step (2007).

Subsequently, whether the collected "O" password coincides or not is discriminated (2008). If it is determined that it coincides, the processing routine is finished and the ordinary printing process is executed. This is because all operations of the owner of the owner password are permitted.

If it is determined in step (2008) that the password does not coincide, whether print inhibition setting has been designated in the IWP or not is discriminated in step (2009). If it is not designated, the ordinary printing process is executed.

If it is determined in step (2009) that the print inhibition has been designated, whether the printing in down-sampling has been set by the user or not is discriminated in step (2010). If it is determined that the printing in down-sampling has been set, a process for setting resolutions of all data to be printed to the resolution of the display screen (96 dpi in Windows (registered trademark)) is executed in step (2011) and the processing routine is finished. Although such a process differs depending on each system, a method whereby the drawing is performed to a DC (device context) obtained for the display screen and the resolution is reduced is generally used. After this process is finished, the drawing process after step (2102) shown in FIG. 15 is executed.

If it is determined in step (2010) that the printing in down-sampling is not set, in order to execute a process for notifying the upper application of such a fact, the upper application is notified of the OPEN error of the file and the error code in step (2012). The processing routine is finished.

Figure 40:
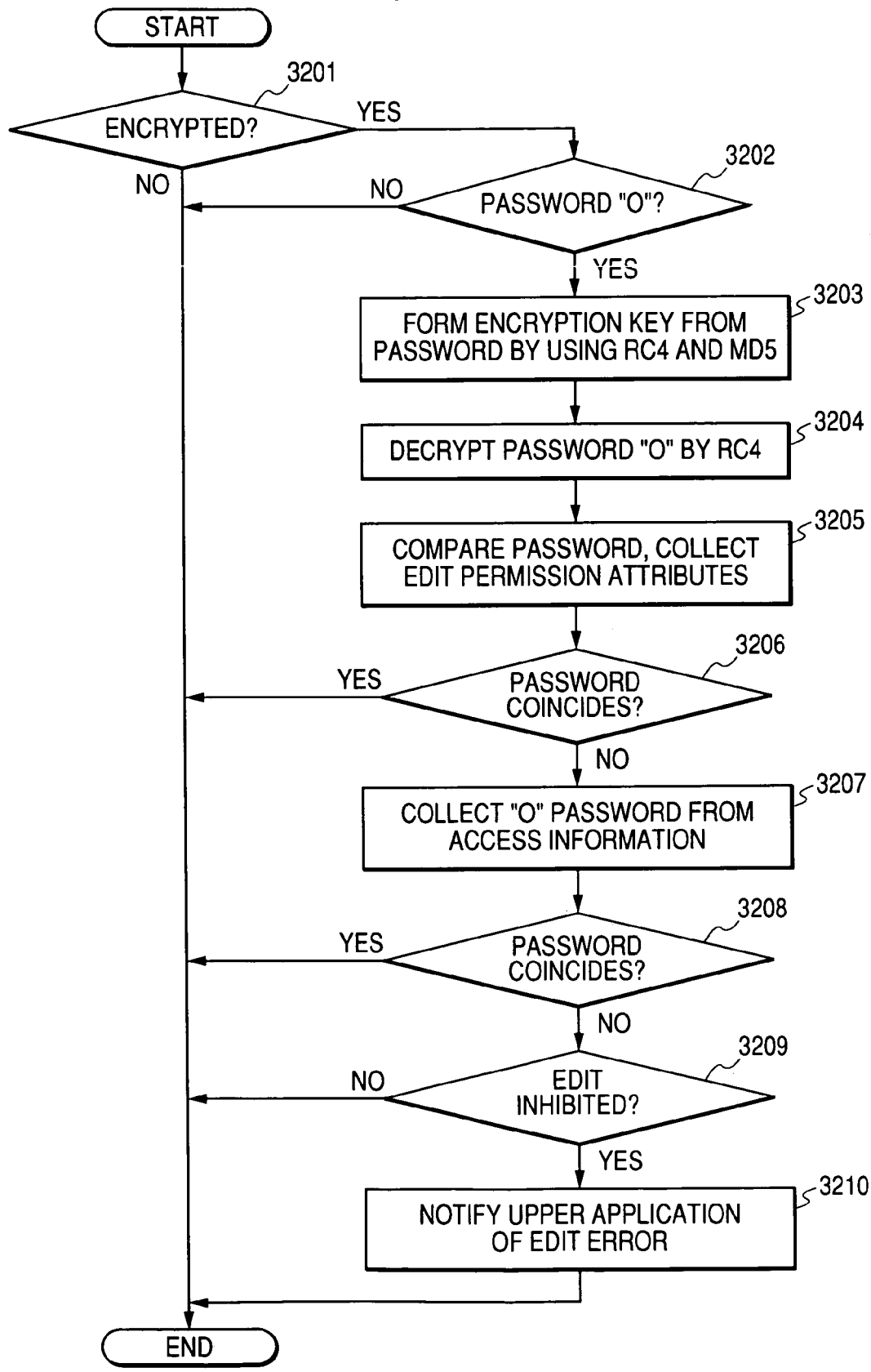
FIG. 40 is a flowchart showing an example of the data processing procedure in the document processing system according to the embodiment.

FIG. 40 is a flowchart showing an example of the data processing procedure in the document processing system according to the embodiment and corresponds to the case where the IWP file has been encrypted. Reference numerals (3201) to (3210) denote processing steps.

In a manner similar to step (1902) shown in FIG. 12, whether the IWP file has been encrypted or not is discriminated (3201).

If the file is an ordinary IWP file, since it is not encrypted, the processing routine is finished and advances to step (2105) shown in FIG. 15 and the drawing process is executed as it is.

The owner password "O" can be preset into the IWP file in order to set permission of the file printing, editing, or the like.

Therefore, if it is decided in step (3201) that the IWP file has been encrypted, whether the owner password "O" has been set into the IWP file or not is further discriminated (3202). If it is determined that the owner password "O" is not set into the IWP file, the processing routine is finished in order to execute the ordinary editing process.

If it is determined in step (3202) that the owner password "O" has been set, it is necessary to decrypt the owner password stored in the IWP file.

Therefore, when it is determined that the password "O" has been set, if the password has previously been designated by the upper application or if the "U" user password has been designated, the forming process of the encryption key is executed by using such a password (3203).

At this time, when the password is shorter than 32 bytes, insufficient bytes from the head of the character string are added to the password.

When the owner password designated by the upper application exists, the forming process of the encryption key is executed by using the character string.

Subsequently, the owner password "O" set in the IWP file is decrypted by RC4 (3204). The password which has been extracted from the IWP file and decrypted is compared with the predetermined character string (3205). Whether they coincide or not is discriminated (3206). If it is determined that they coincide, it is decided that the correct password has been set. The processing routine is finished and the ordinary editing process is executed. This is because all operations of the owner of the owner password are permitted.

If it is determined in step (3206) that the password does not coincide, the document access manager is instructed to collect the "O" password in step (3207).

Subsequently, whether the collected "O" password coincides or not is discriminated (3208). If it is determined that it coincides, the processing routine is finished and the ordinary editing process is executed. This is because all operations of the owner of the owner password are permitted.

If it is determined in step (3208) that the password does not coincide, whether edit inhibition setting has been designated in the IWP or not is discriminated in step (3209). If it is not designated, the ordinary editing process is executed.

If it is determined in step (3209) that the edit inhibition has been designated, in order to execute a process for notifying the upper application of such a fact, the upper application is notified of the OPEN error of the file and the error code in step (3210). The processing routine is finished.

When the instruction from the operator is the contents extraction, a series of processes in which the process equivalent to the "edit inhibition" of the processes in steps 3201 to 3210 mentioned above is replaced with the Contents extraction inhibition is executed.

The relation between the document access manager and the management table shown in FIG. 2 will now be described in detail.

FIGS. 17 to 21 and 33 to 36 are diagrams each showing an example of a table group which is managed by the document access manager 2304 shown in FIG. 2. FIG. 17 corresponds to the Print number valid term restriction table 2305. FIG. 18 corresponds to the View number valid term restriction table 2306. FIG. 19 corresponds to the management table 2307 of Print ID and the password. FIG. 20 corresponds to the management table 2308 of View ID and the password. FIG. 21 corresponds to the table 2309 showing relation between the original document and the published document. FIG. 33 corresponds to the Edit number valid term restriction table 2310. FIG. 34 corresponds to the Contents Ex (extraction) number valid term restriction table 2311. FIG. 35 corresponds to the management table 2312 of Edit ID and the password. FIG. 36 corresponds to the management table 2313 of Contents ExID and the password.

First, each table will be described.

Information of Print ID formed in each application, a restriction counter of the number of printing times, and "valid term" to set a public term of the electronic document is stored in the Print number valid term restriction table 2305.

Information of View ID formed in each application, a restriction counter of the number of browsing times, and "valid term" to set a public term of the electronic document is stored in the View number valid term restriction table 2306.

Information of Edit ID formed in each application, a restriction counter of the number of editing times, and "valid term" to set a public term of the electronic document is stored in the Edit number valid term restriction table 2310.

Information of Contents ExID formed in each application, a restriction counter of the number of Contents extracting times, and "valid term" to set a public term of the electronic document is stored in the Contents Ex number valid term restriction table 2311.

In the case of opening the encrypted electronic document, a password is necessary. Therefore, information showing the correspondence between the name of the file in which such a password has been stored and information (Print ID) to specify the document is stored in the management table 2307 of Print ID and the password.

In the case of opening the encrypted electronic document, a password is necessary. Therefore, information showing the correspondence between the name of the file in which such a password has been stored and information (View ID) to specify the document is stored in the management table 2308 of View ID and the password.

In the case of opening the encrypted electronic document, a password is necessary. Therefore, information showing the correspondence between the name of the file in which such a password has been stored and information (Edit ID) to specify the document is stored in the management table 2312 of Edit ID and the password.

In the case of opening the encrypted electronic document, a password is necessary. Therefore, information showing the correspondence between the name of the file in which such a password has been stored and information (Contents ExID) to specify the document is stored in the management table 2313 of Contents ExID and the password.

Information showing the relations between Document ID, Print ID, View ID, Edit ID, Contents ExID, and Public user ID is stored in the table 2309 showing relation between the original document and the published document (refer to FIG. 21).

[Process for Registering the Access Restriction of the Document into the Manager]

First, the document forming application 2301 shown in FIG. 2 is activated. In the document forming application, when the access right is designated, information to be registered into the manager is formed. The information is the user password "U", owner password "O", Document ID, and Public user ID for opening the file. The application requests the document access manager 2304 to register those information.

The document access manager 2304 registers the information into the Print number valid term restriction table (refer to FIG. 17), the View number valid term restriction table (refer to FIG. 18), the Edit number valid term restriction table (refer to FIG. 33), the Contents Ex (extraction) number valid term restriction table (refer to FIG. 34), the management table of Print ID and the password (refer to FIG. 19), the management table of View ID and the password (refer to FIG. 20), the management table of Edit ID and the password (refer to FIG. 35), the management table of Contents ExID and the password (refer to FIG. 36), and the table showing relation between the original document and the published document (refer to FIG. 21), respectively.

The processes for forming the document and registering the access information will be further described hereinbelow with reference to FIGS. 22, 23A, and 23B.

Figure 22:
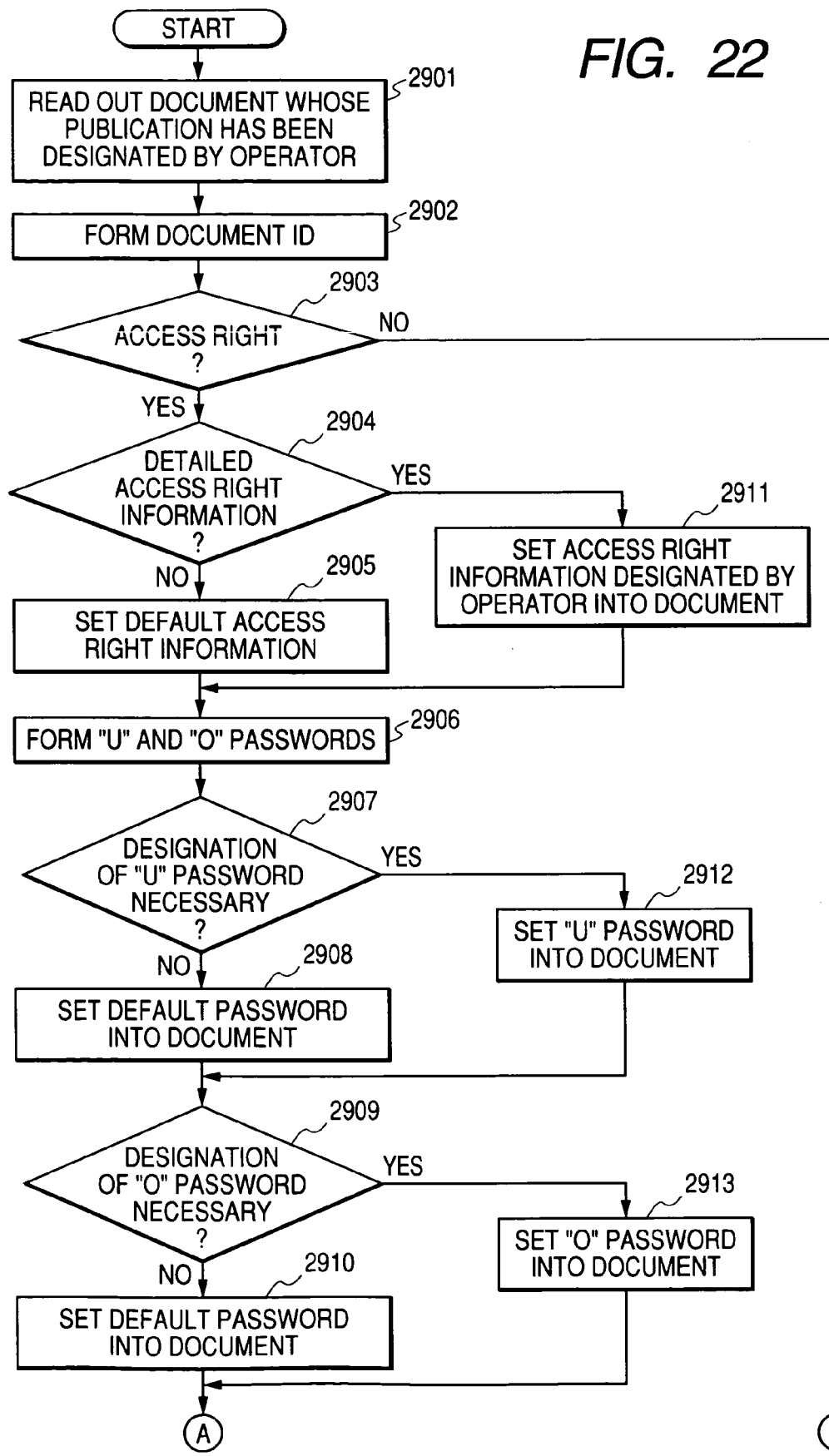
FIG. 22 is a flowchart showing an example of the data processing procedure in the document processing system according to the embodiment.
Figure 23A:
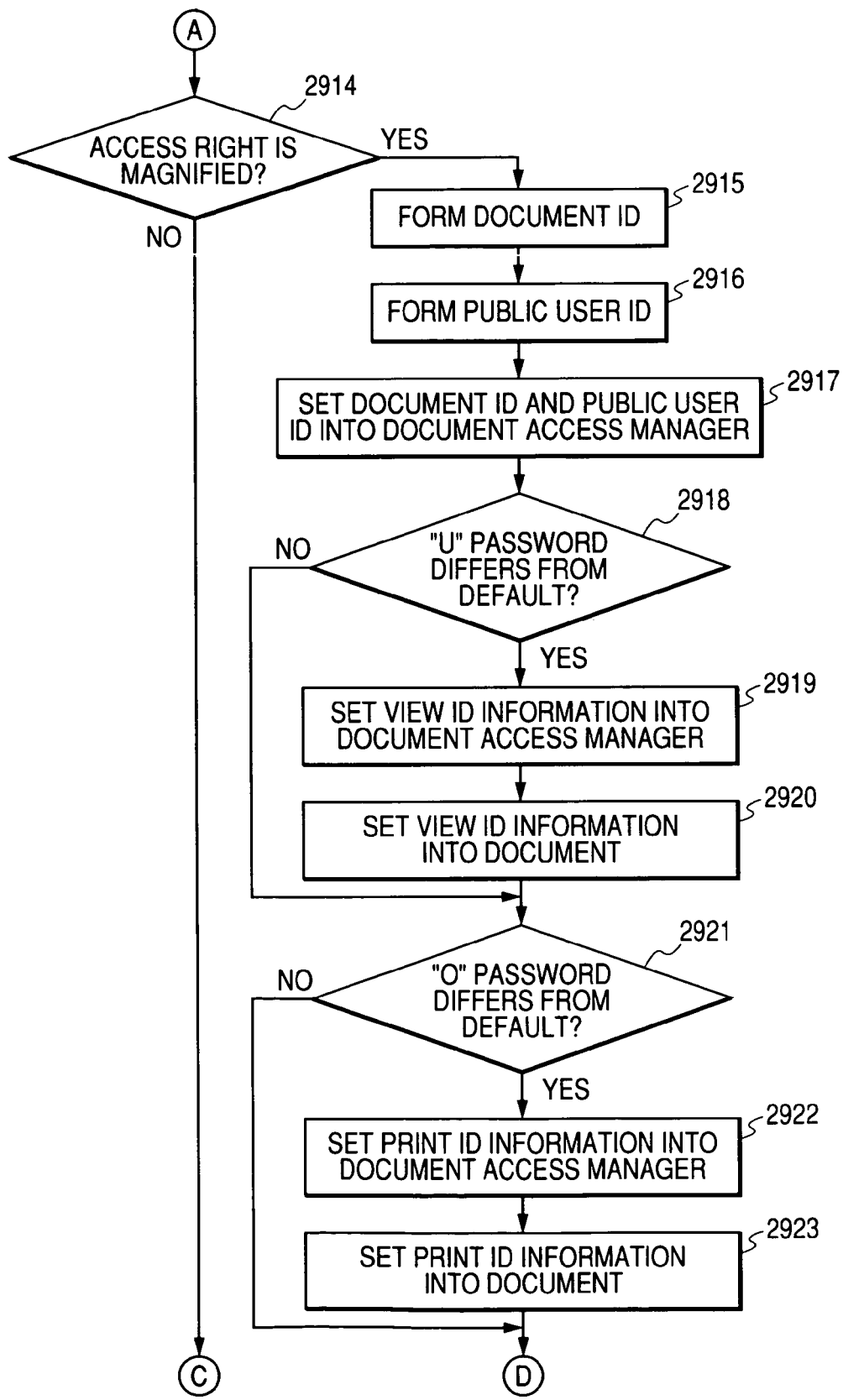
FIG. 23A is a flowchart showing an example of the data processing procedure in the document processing system according to the embodiment.
Figure 23B:
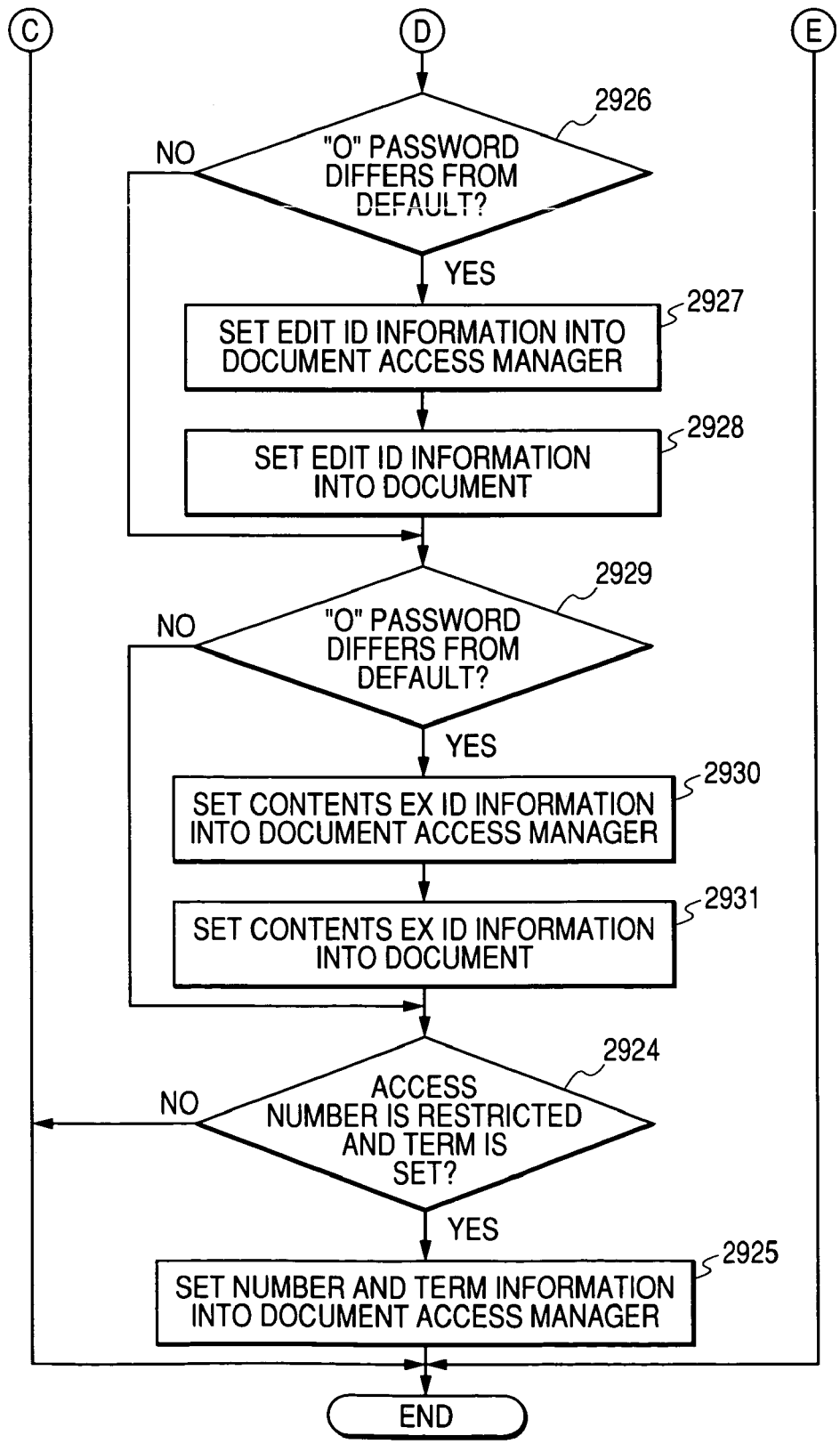
FIG. 23B is a flowchart showing an example of the data processing procedure in the document processing system according to the embodiment.

FIGS. 22, 23A, and 23B are flowcharts each showing an example of the data processing procedure in the document processing system according to the embodiment and correspond to the processing procedure for forming the document and registering the access information. Reference numerals (2901) to (2931) denote processing steps.

First, the document whose publication has been designated is read out by the operator (2901). Subsequently, Document ID is formed (2902). Whether the access restriction has been set by the operator or not is discriminated (2903). If it is determined that it is not set, the process is skipped here and the processing routine is finished.

If the access restriction has been set, the presence or absence of detailed information of the access right is discriminated (2904). If the detailed information exists, the access right information designated by the operator is set into the electronic document (document). If it does not exist, a default access right is set into the electronic document (document) (2905).

Subsequently, the encryption passwords "U" and "O" which are necessary when the access right information is set into the document are formed (2906). Whether the setting of the "U" password has been designated by the operator or not is discriminated (2907). If it is determined that the setting of the "U" password has been designated, the "U" password is set into the document (2912) and step (2909) follows.

If it is determined in step (2907) that the setting of the "U" password is not designated, a default password which has been predetermined by the system is set into the document (2908).

Subsequently, whether the setting of the "O" password has been designated by the operator or not is discriminated (2909). If it is determined that the setting of the "O" password has been designated, the "O" password is set into the document (2913) and step (2914) follows.

If it is determined that the setting of the "O" password is not designated, a default password which has been predetermined by the system is set into the document (2910).

A process for changing the access right by the designation of the operator after the document was formed will now be described.

First, whether the access right is enlarged in the halfway or not is discriminated (2914). If it is determined that the access right is not enlarged, the processing routine is finished.

If it is determined in step (2914) that the access right is enlarged, Document ID to be registered into the manager is formed (generated) (2915). Subsequently, Public user ID to be registered into the manager is formed (2916).

Formed Document ID and Public user ID are generated into the document access manager 2304 (2916). Subsequently, Document ID and Public user ID are set into the document access manager 2304 (2917). Whether the "U" password designated by the operator differs from the default password or not is discriminated (2918). If it is determined that they are not different, a process in step (2921) follows.

If it is determined in step (2918) that the "U" password differs, when the publication of only the display is permitted, View ID and the password information are registered into the document access manager 2304 (2919). The password information is set into the document access manager 2304 (2920).

Subsequently, whether the "O" password designated by the operator differs from the default password or not is discriminated (2921). If it is determined that the "O" password does not differ, a process in step (2926) follows.

If it is determined in step (2921) that the "O" password differs, Print ID to permit the printing is registered (set) into the document access manager 2304 (2922). The password is registered into the document access manager 2304 (2923).

If it is determined in step (2926) that the "O" password differs, Edit ID to permit the editing is registered (set) into the document access manager 2304 (2927). The password is registered into the document access manager 2304 (2928).

Subsequently, whether the "O" password designated by the operator differs from the default password or not is discriminated (2926). If it is determined that the "O" password does not differ, a process in step (2929) follows.

If it is determined in step (2929) that the "O" password differs, Contents Ex (extraction) ID to permit the printing is registered (set) into the document access manager 2304 (2930). The password is registered into the document access manager 2304 (2931).

Subsequently, whether the number of accessing times has been set by the operator or not is discriminated (2924). If it is not set, the processing routine is finished.

If it is determined in step (2924) that the number of accessing times has been set, the permitted number of accessing times and the term information are set into the document access manager 2304 (2925) and the processing routine is finished.

[The Case of Drawing the Document with Access Restriction]

First, the document drawing application 2302 shown in FIG. 2 is activated. In the document forming application 2301, when it is necessary to inquire about the access right, if Print ID and View ID have been set in the electronic document, the operator inquires of the document access manager 2304.

The user password "U" and the owner password "O" for opening and drawing the file are inquired.

The document drawing application 2302 requests the document access manager 2304 to send those information.

The document access manager 2304 confirms the number of restricting times and the term by the Print number valid term restriction table (refer to FIG. 17), the View number valid term restriction table (refer to FIG. 18), the Edit number valid term restriction table (refer to FIG. 33), and the Contents Ex (extraction) number valid term restriction table (refer to FIG. 34). If the number of restricting times and the term are within a predetermined range, the document access manager 2304 specifies the password information from the management table of Print ID and the password (refer to FIG. 19), the management table of View ID and the password (refer to FIG. 20), the management table of Edit ID and the password (refer to FIG. 35), and the management table of Contents ExID and the password (refer to FIG. 36) and sends it to the document drawing application 2302.

[The Case of Changing the Document Access Right after the Creation]

First, the document access right changing application 2303 is activated. In the document forming application 2301, when the change in access right is designated, information to change and register the access right is formed into the document access manager 2304.

In this case, the user password "U", the owner password "O", Document ID, and Public user ID for opening the file are formed.

For example, in the case of giving a print permission to the electronic document whose printing is not permitted, it is necessary to register the owner password into the manager.

The document forming application 2301 requests the document access manager 2304 to change and register those information. The document access manager changes and sets the information into the Print number valid term restriction table (refer to FIG. 17), the View number valid term restriction table (refer to FIG. 18), the Edit number valid term restriction table (refer to FIG. 33), the Contents Ex (extraction) number valid term restriction table (refer to FIG. 34), the management table of Print ID and the password (refer to FIG. 19), the management table of View ID and the password (refer to FIG. 20), the management table of Edit ID and the password (refer to FIG. 35), the management table of Contents ExID and the password (refer to FIG. 36), and the table showing relation between the original document and the public document (refer to FIG. 21), respectively. Thus, the access information can be successively changed.

The drawing process of each page in steps (904) to (907) shown in FIG. 11 will be described hereinbelow with reference to FIG. 24 and the like.

Figure 24:
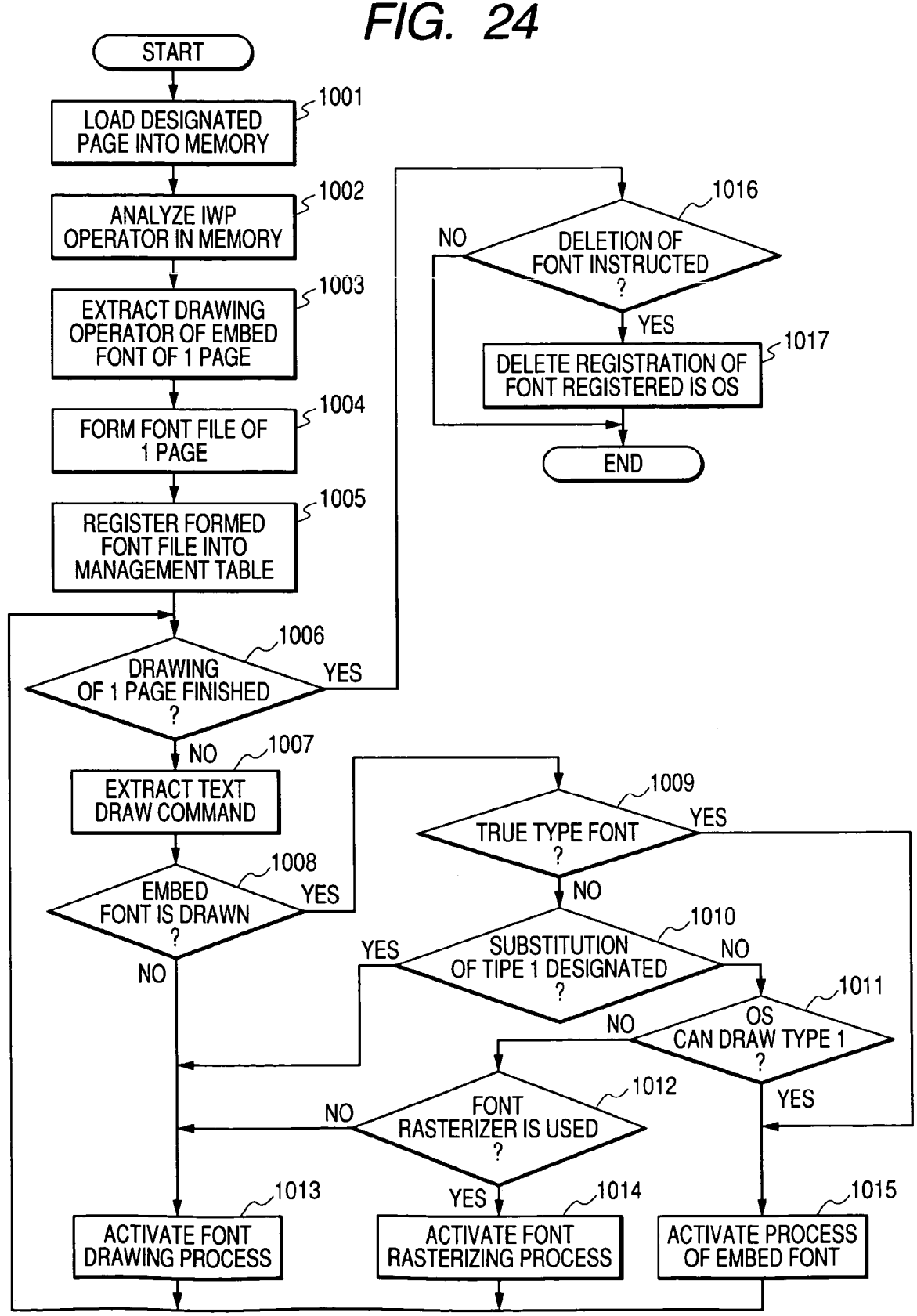
FIG. 24 is a flowchart showing an example of the data processing procedure in the document processing system according to the embodiment.

FIG. 24 is a flowchart showing an example of the data processing procedure in the document processing system according to the embodiment and corresponds to the drawing processing procedure of each page. Reference numerals (1001) to (1017) denote processing steps. This flow corresponds to the processes of the document drawing application 2302 and the like shown in FIG. 2.

When the page drawing process is activated, first, the designated page is loaded into the memory (1001). Subsequently, the operator is analyzed in accordance with the specifications of the IWP file in order to draw the IWP file loaded in the memory (1002). An embed font which is used in the designated page is confirmed and the drawing operator of the embed Font of one page is extracted (1003). The Font File of one page is formed (1004).

Subsequently, the Font File is registered into the Font File management table (1005). At this time, the Font File is not formed again with respect to the font which has already been formed as described in FIG. 6.

Whether the drawing of one page has been finished or not is discriminated (1006). If it is determined that the drawing has been finished, the processing routine advances to a discriminating process in step (1016).

Page layout printing will be described prior to explaining the next font deleting process.

Figure 25:
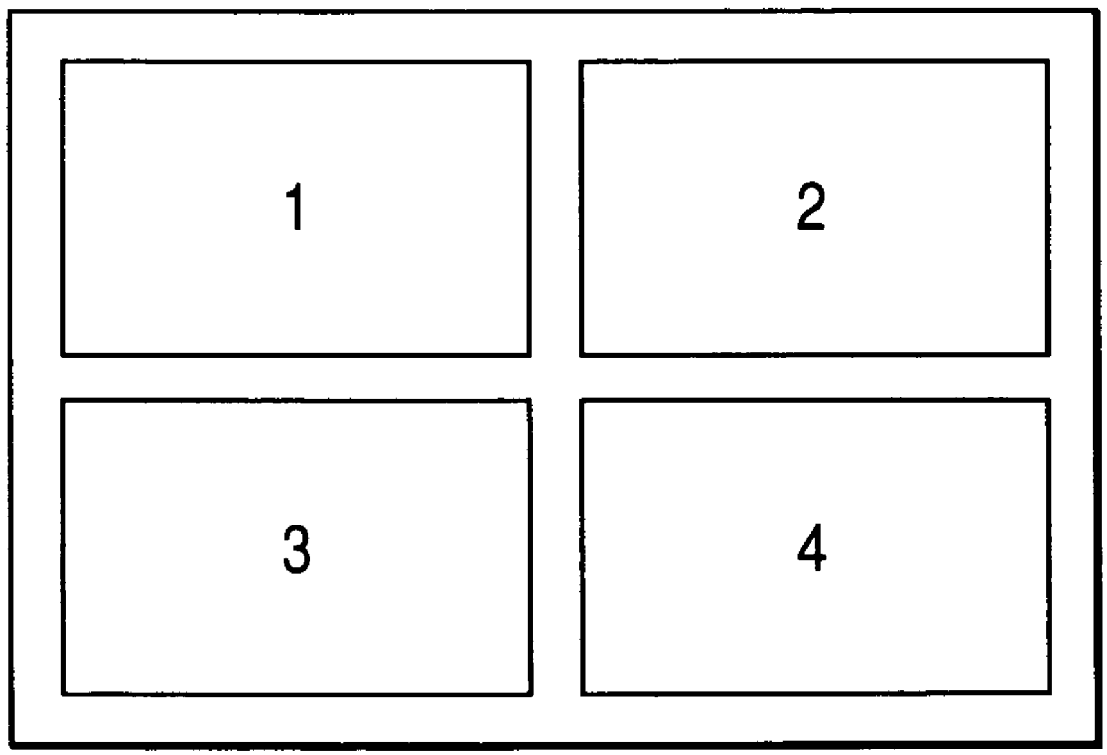
FIG. 25 is a schematic diagram for explaining a drawing processing state in the document processing system according to the embodiment.

FIG. 25 is a schematic diagram for explaining a drawing processing state in the document processing system according to the embodiment. For example, it shows an example of the printing in the case of performing the 4up layout printing from the application.

In the upper application, a process for printing a plurality of pages into one page is independently executed without using a printer driver in order to enhancing a booklet function.

Specifically speaking, a device context to store the drawing data for printing is formed by the upper application and the drawing instruction to this device context is made to a drawing application.

At this time, in the 4up layout printing mode, the drawing instruction is made four times per page. The drawing application draws an image in instructed location and size (actually, page images are reduced and printed), so that the data of the 4up layout can be finally formed on the device context.

At this time, when the upper application finishes all of the printing operations in the layout printing mode and a deletion of the registration of the font registered in the OS is requested, the deleting instruction from the upper application is sent to the drawing application through a dedicated API.

The presence or absence of the deleting instruction is discriminated (1016). If it is determined that the deleting instruction of the font does not exist, the processing routine is finished as it is. In this case, the upper application is on the way of the layout printing and does not delete the font registered in the OS.

If it is determined in step (1016) that the deleting instruction exists, the drawing application deletes the registration of all fonts registered in the OS from the OS (1017) and the processing routine is finished.

When the application prints only one page, it is necessary to predetermine the specifications so as to certainly instruct the drawing application to delete the fonts when the printing of one page is finished.

If it is determined in step (1006) that the drawing is not finished, the next TEXT draw command is extracted (1007). Whether the font is the embed font or not is discriminated with respect to the extracted TEXT draw command (1008). If it is determined that the font is the embed font, step (1009) follows. Whether the font is TrueType (registered trademark) or not is discriminated. If it is determined that the font is not the embed font, an ordinary font drawing process is activated (1013). After completion of this process, the processing routine is returned to the discriminating step about the completion of the drawing process of one page (1006).

If it is determined in step (1009) that the font is the TrueType (registered trademark) font, the font can be registered as it is into the OS and drawn. Therefore, step (1015) follows and an embed font drawing process is activated. The processing routine is returned to step (1006).

If it is determined in step (1009) that the font is not the TrueType (registered trademark) font, step (1010) follows and whether the substitution of Type1 has been designated or not is discriminated.

This is because there is a case where the embed font of Type1 is fixedly substitution-set to TrueType (registered trademark) in order to avoid such a state where the font face of the Type1 font which is drawn becomes different because conditions in which the font is substituted or not and the like differ depending on the OS in accordance with the user.

At this time, the substitution font can be previously designated by a font substitution table for unconditionally designating the font to be substituted.

Therefore, in step (1010), whether the setting for previously and fixedly substituting the TrueType (registered trademark) font for the Type1 font has been made or not is confirmed. If it is decided that the substitution setting has been made, the processing routine advances to the Font drawing process in step (1013).

If it is decided in step (1010) that the substitution setting is not made, whether the OS can draw the Type1 font or not is discriminated (1011). If it is decided that the OS can draw the Type1 font, the drawing process of the embed font is executed (1015). The processing routine is returned to step (1006).

If it is decided in step (1011) that the OS does not support the drawing of the Type1 font, whether a rasterizer of the font is used or not is discriminated (the preset values have been collected) (1012). If it is determined that use of the rasterizer has been set, a Font rasterizing process is executed (1014) and the processing routine is returned to step (1006).

Figure 26:
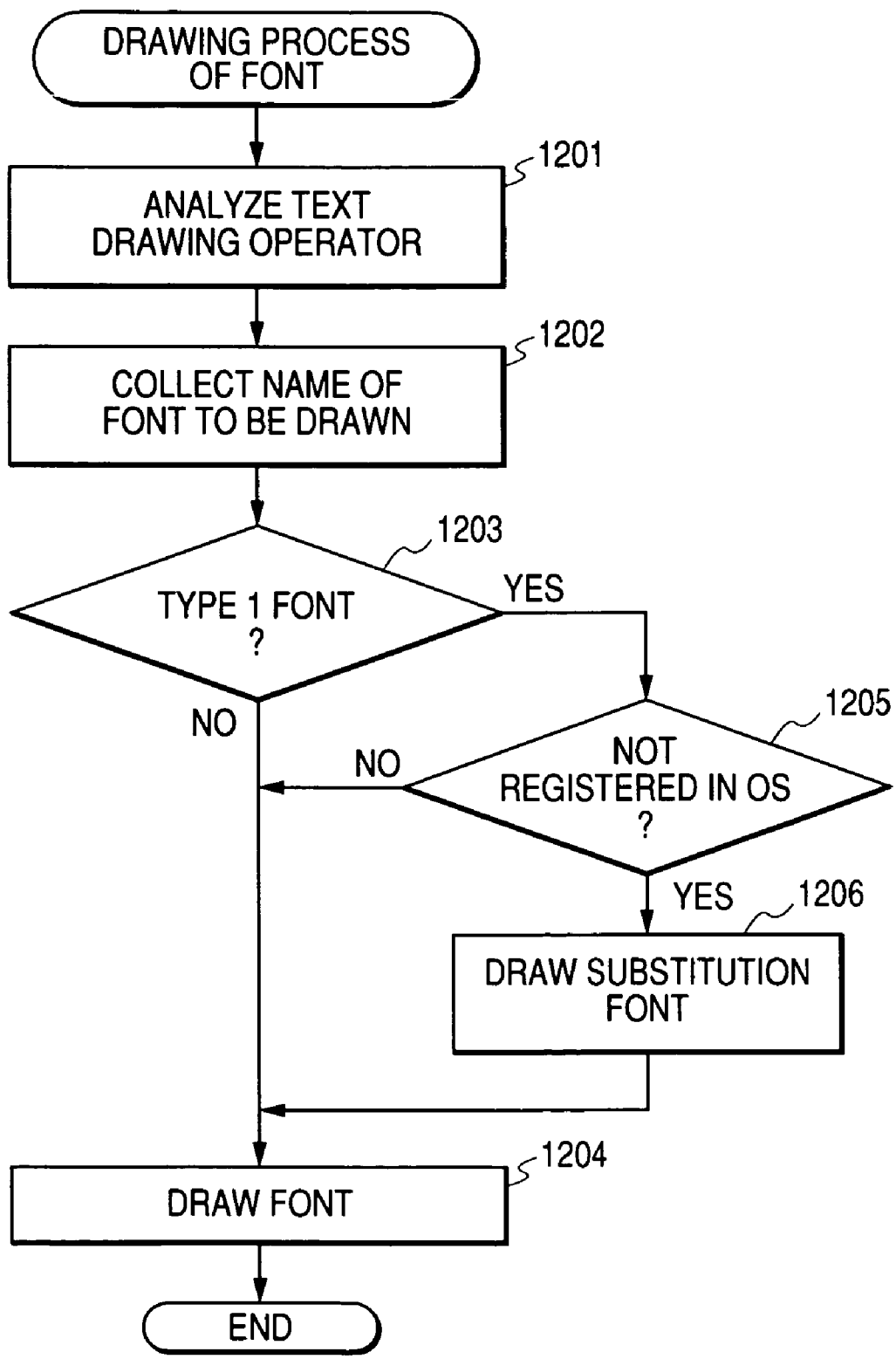
FIG. 26 is a flowchart showing an example of the data processing procedure in the document processing system according to the embodiment.

FIG. 26 is a flowchart showing an example of the data processing procedure in the document processing system according to the embodiment and corresponds to the font drawing processing procedure in step (1013) shown in FIG. 24. Reference numerals (1201) to (1206) denote processing steps.

When the font drawing process is activated, first, TEXT drawing operator information is collected from the IWP operator analyzed in step (1002) shown in FIG. 24 and analyzed (1201). Similarly, the name of font to be drawn is collected (1202).

Whether the font to be drawn is the Type1 font or not and the fixed substitution setting as described in step (1010) shown in FIG. 24 has been made or not is discriminated (1203) from the information in steps (1201) and (1202). If it is determined that the font is not the Type1 font and the substitution setting is not made, a TEXT draw command of the OS is formed and the TEXT is drawn in step (1204). After completion of the TEXT drawing, the processing routine is returned to the activating source side.

If it is determined in step (1203) that the font is the Type1 font and the substitution setting is made, whether this font has already been registered in the OS or not is discriminated (1205). If it is determined that the font has been registered, the processing routine advances to step (1204) in order to execute the font drawing in a manner similar to the font drawing of the TrueType (registered trademark) font.

When it is determined in step (1205) that the font is not registered in the OS, if a substitution designation table of the font which has previously been designated (substitution designation table of the font shown in FIG. 27) described in step (1012) shown in FIG. 24 exists and the font to be substituted has already been set, the processing routine advances to the process in step (1204).

If the substitution designation table of the font is not designated in step (1205), the process in step (1206) follows.

The name of the font to be substituted is searched from the substitution font table (substitution designation table of the font shown in FIG. 27) and this font information is sent to a font substituting process by the OS.

In the font substituting process by the OS, if the font to be drawn is designated, the text is drawn by this font. If it is not designated, the font designating process is executed to the OS by using the name of the Type1 font and the font is drawn by using the font substituting process by the OS (1206) and step (1204) follows.

The OS has a function for selecting the optimum font from the font information when the drawing of the font which is not registered in the OS is instructed.

Figure 28:
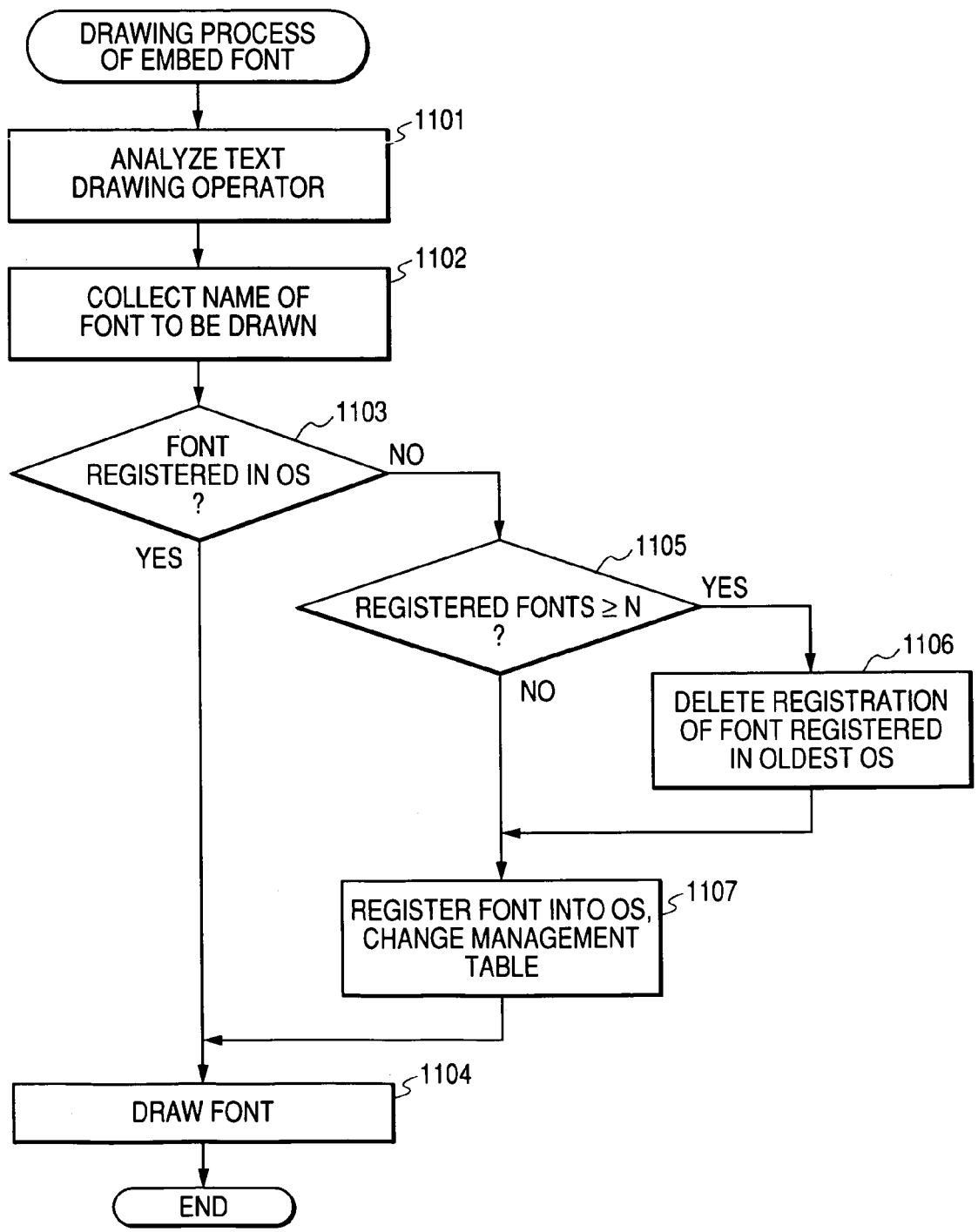
FIG. 28 is a flowchart showing an example of the data processing procedure in the document processing system according to the embodiment.

FIG. 28 is a flowchart showing an example of the data processing procedure in the document processing system according to the embodiment and corresponds to the drawing processing procedure of the embed font in step (1014) shown in FIG. 24. Reference numerals (1101) to (1107) denote processing steps.

When the drawing process of the embed font is activated, first, the TEXT operator is analyzed (1101). The name of the font to be drawn is collected (1102). In the case of drawing a plurality of pages, if the same font has been drawn at the page which had previously been drawn, there is a case where this font has been registered in the OS. In such a case, the font must not be registered in the OS.

Therefore, whether the font has already been registered in the OS or not is discriminated (1103). If it is decided that it has been registered, the drawing process of the font is executed (1104). The processing routine is finished.

If it is decided in step (1103) that it is not registered in the OS, the Font management table is confirmed and the number of fonts registered in the OS is examined. Whether the number of fonts registered in the OS is equal to or larger than N (maximum value) or not is discriminated (1105). If it is decided that the number of fonts is equal to or larger than N (maximum value), the font registered in the oldest OS is deleted from the registration of the OS (1106). A process in step (1107) follows.

If it is determined in step (1105) that the number of fonts registered into the OS is less than N (maximum value), the embed font is registered into the OS as it is and the management table is changed (1107). The processing routine advances to the font drawing process in step (1104).

In the font drawing process in step (1104), when the rasterizing process of the font is executed, information necessary for drawing the font such as resolution, size, and the like of the font to be drawn is collected.

In this case, information regarding a header area where various information necessary for drawing the font is stored and a glyph area where the drawing information of the font is stored and Hint information for adjusting a thickness and a position of a line in accordance with a drawing resolution are collected.

To rasterize the font, the original font has to be accurately developed into a bitmap data by using those information. The bitmap (font) data formed in this manner is drawn in the designated position of an original. At this time, if a color already exists in a background, it is necessary to calculate a display color, particularly, in a boundary area so that the background color and the font color are smoothly continued.

Figure 29:
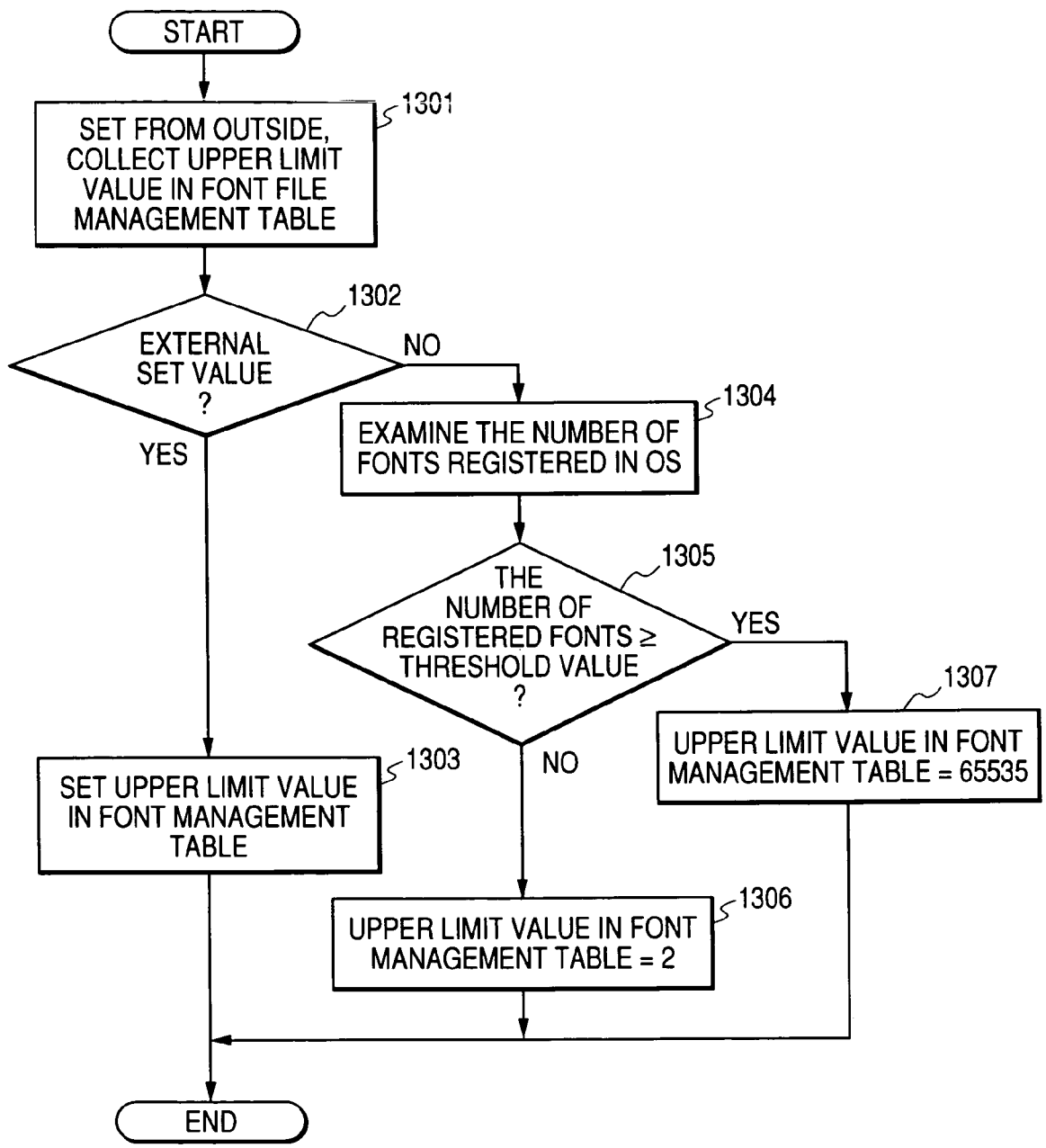
FIG. 29 is a flowchart showing an example of the data processing procedure in the document processing system according to the embodiment.

FIG. 29 is a flowchart showing an example of the data processing procedure in the document processing system according to the embodiment and corresponds to the Font management table initial setting processing procedure in step (903) shown in FIG. 11. Reference numerals (1301) to (1307) denote processing steps.

The initial setting of the Font management table is activated. First, when this software is activated from the outside, an upper limit value in the Font management table is collected (1301).

The presence or absence of an external set value is discriminated (1302). If it is decided that the external set value exists, it is set as an "upper limit value in the Font management table" (1303) and the processing routine is finished.

If it is decided in step (1302) that the external set value does not exist, the number of fonts registered in the present OS is examined (1304).

Whether the number of registered fonts is larger than a preset threshold value or not is discriminated. If it is decided that it is larger than the threshold value, "65535" is set into the upper limit value in the Font management table (1307) and the processing routine is finished.

If it is decided in step (1305) that the number of registered fonts is equal to or less than the preset threshold value, "2" is set into the upper limit value in the Font management table (1307) and the processing routine is finished.

As an upper limit value which has fixedly been determined upon developing the present software, the threshold value is assumed to be "65535" in present Claims in order to hold the registration of the font into the OS until the page is printed. Thus, in the actual use situation, the case of executing the process in step (1306) is omitted.

The maximum value "65535" or "2" of the upper limit value in the Font management table can be changed upon developing the present software.

Although the embodiment has been described above with respect to the case where the document processing system is constructed as a stand-alone system, the embodiment can be also applied to a document processing system which can communicate with a server PC via the network. Such an embodiment will now be described hereinbelow.

Figure 30:
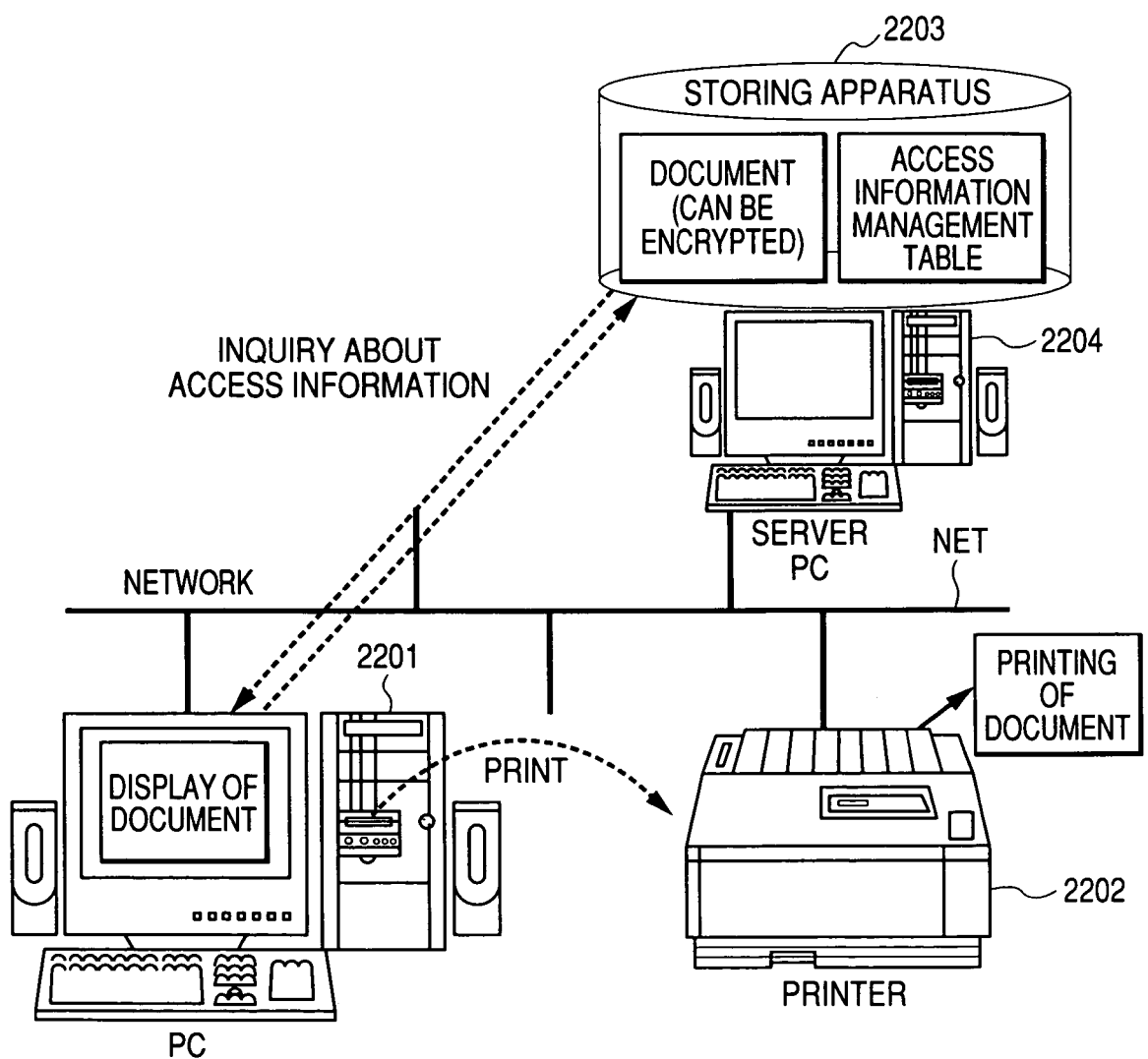
FIG. 30 is a diagram for explaining an example of a construction of the document processing system.

FIG. 30 is a diagram for explaining a construction of the document processing system showing the second embodiment of the invention and the same component elements as those in FIG. 1 are designated by the same reference numerals and processes of the document and the access information will now be described hereinbelow.

The system comprises a server PC 2204 and the printer 2202 connected to the same network as that of the PC 2201. In the PC, the document forming application and the document drawing application execute the operation. The documents (electronic documents) formed by the client PC have been stored in the server PC. The access information management table has also been stored in order to manage the access information of those documents.

In the case of drawing the electronic document onto the display screen or printing it, the PC 2201 accesses the storing apparatus 2203 and extracts the relevant electronic document by the operation of the operator.

Subsequently, if the electronic document has been encrypted, when the password which is managed by the server PC 2204 is necessary for decrypting the encryption or the password which is managed by the server PC 2204 is necessary for printing, a request (inquiry about the access information) is made to the document access manager on the server PC 2204 and the access information management table is referred to. If the relevant font has been registered, the password can be obtained.

If the drawing of this electronic document is permitted, it is drawn on the display screen. If the printing is permitted, it is printed by the printer 2202. If they are not permitted, the operator is notified of an error.

Although the embodiment has been described in the case where the document processing system is constructed as a stand-alone system, the invention can be also applied to a document processing system in such a form that it can communicate with the server PC via the network and a predetermined security system has been added to an access on the network. Such an embodiment will now be described hereinbelow.

Figure 31:
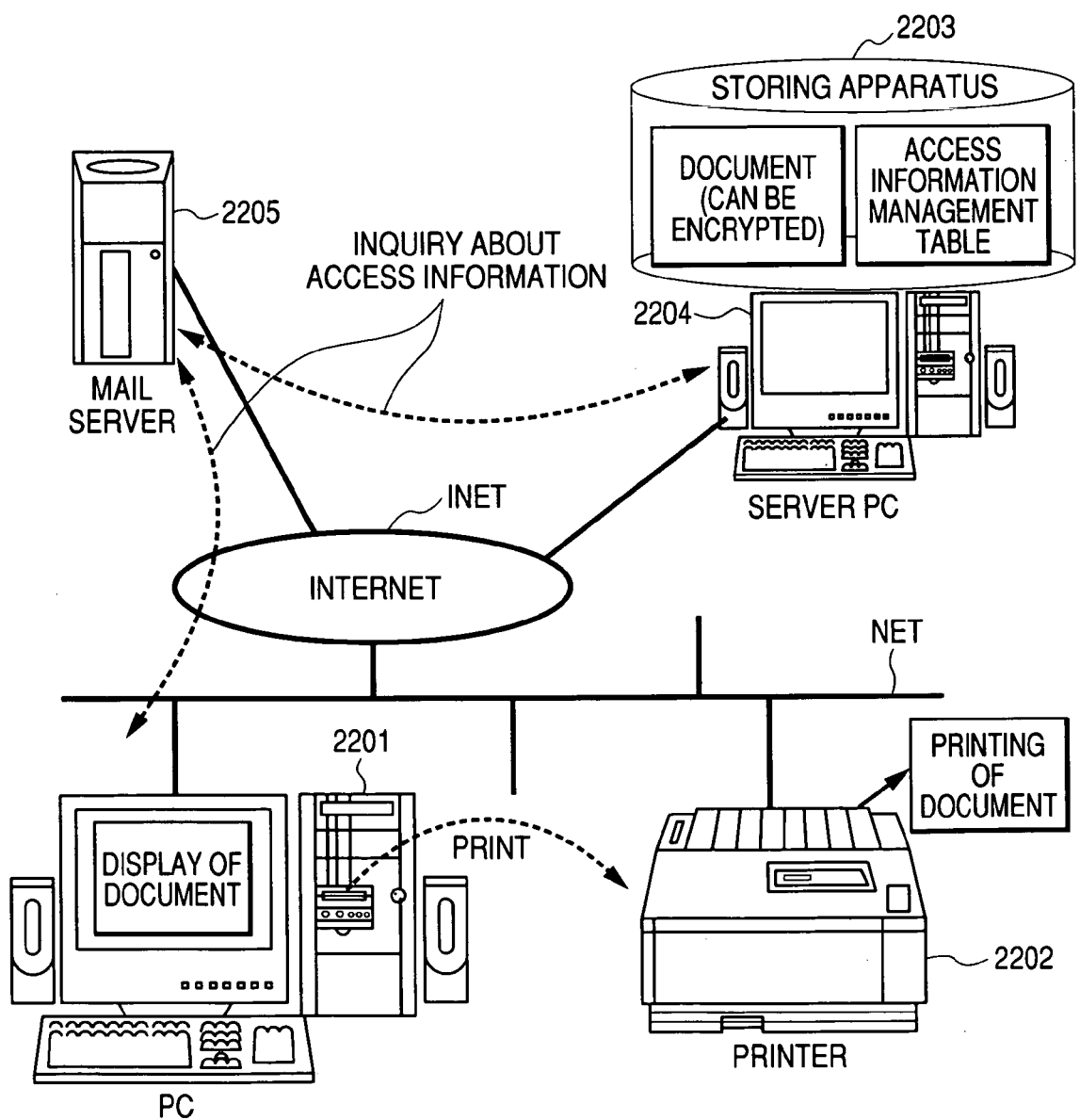
FIG. 31 is a diagram for explaining an example of a construction of the document processing system.

FIG. 31 is a diagram for explaining a construction of the document processing system showing the third embodiment of the invention and the same component elements as those in FIG. 1 are designated by the same reference numerals and processes of the document and the access information will now be described hereinbelow. The server PC 2204 and a mail server 2205 correspond to an example of a system which can communicate via an Internet INET.

The system comprises the server PC 2204 and the printer 2202 connected to the same network as that of the PC 2201. In the PC, the document forming application and the document drawing application execute the operation. The documents (electronic documents) formed by the client PC have been stored in the server PC. The access information management table has also been stored in order to manage the access information of those documents.

In the case of drawing the electronic document onto the display screen or printing it, the PC 2201 forms request E-mail for extracting the electronic document from the server PC 2204 by the operation of the operator and sends it to the mail server 2205. If there is a transmitting request of the document, the server PC 2204 sends the document to the client PC 2201 by E-mail. If the electronic document received by the client PC 2201 has been encrypted, when the password which is managed by the server PC 2204 is necessary for decrypting the encryption or the password which is managed by the server PC 2204 is necessary for printing, a request is made to the document access manager on the server PC 2204 by E-mail and the access information management table is referred to. If the relevant font has been registered, the password can be obtained. If the drawing of this electronic document is permitted, it is drawn on the display screen. If the printing is permitted, it is printed by the printer. If they are not permitted in any case, the operator is notified of an error.

According to the embodiment, it is possible to solve such a problem that the font information drawn on a GDI or DDI by the drawing software cannot reach the printer driver in dependence on a system condition in which an operating speed of the printer driver is low or the like.

Further, the same font is often used over a plurality of pages. In such a case, when the font are used over the pages in the layout mode, the process for deleting and registering the font can be reduced, so that the improvement in performance can be expected.

A construction of data processing programs which can be read out by the document processing system according to the embodiment will now be described with reference to a memory map shown in FIG. 32.

FIG. 32 is a diagram for explaining the memory map in a storing medium for storing various data processing programs which can be read out by the document processing system according to the embodiment.

Although not particularly shown, there is also a case where information to manage the program group which is stored in the storing medium, for example, version information, implementors, and the like are also stored and information which depends on the OS or the like on the program reading side, for example, icons or the like for identifying and displaying the programs are also stored.

Further, data which depends on the various programs is also managed in the directory. There is also a case where a program for installing the various programs into a computer and, if the installing program has been compressed, a program for decompressing it, and the like are also stored.

The functions shown in FIGS. 11 to 16, 22 to 24, 26, 28, and 29 in the embodiments can be executed by a host computer on the basis of a program which is installed from the outside. In such a case, the embodiments are applied even in the case where an information group including the program is supplied to an output apparatus by a storing medium such as CD-ROM, flash memory, FD, or the like or from an external storing medium through a network.

As mentioned above, naturally, the object of the invention is also accomplished by a method whereby a storing medium in which program codes of the software for realizing the functions of the embodiments mentioned above have been recorded is supplied to a system or an apparatus and a computer (or a CPU or an MPU) of the system or the apparatus reads out and executes the program codes stored in the storing medium.

In such a case, the program codes themselves read out from the storing medium realize the novel functions of the embodiments and the storing medium in which the program codes have been stored constructs the embodiments.

Therefore, a format of the program is not limited but an arbitrary format such as object codes, program which is executed by an interrupter, script data which is supplied to the OS, or the like can be used so long as it has the functions of the programs.

As a storing medium for supplying the programs, for example, it is possible to use a flexible disk, a hard disk, an optical disk, a magnetooptic disk, an MO, a CD-ROM, a CD-R, a CD-RW, a magnetic tape, a non-volatile memory card, a ROM, a DVD, or the like can be used.

In this case, the program codes themselves read out from the storing medium realize the functions of the embodiments mentioned above and the storing medium in which the program codes have been stored constructs the invention.

As another supplying method of the program, the program can be supplied by a method whereby the system is connected to a homepage of the Internet by using a browser of the client computer and the computer program itself of the invention or a compressed file including an automatic installing function is downloaded from the homepage into the recording medium such as a hard disk or the like. The program supplying method can be also realized by a method whereby the program codes constructing the program of the invention are divided into a plurality of files and each file is downloaded from a different homepage. That is, a WWW server, an FTP server, and the like for downloading the program files for realizing the functions and processes of the invention by a computer to a plurality of users are also included in Claims of the invention.

The program supplying method can be also realized by a method whereby the program of the invention is encrypted, stored into the storing medium such as a CD-ROM, or the like, and distributed to the user, the user who can meet predetermined conditions is allowed to download key information for decrypting the encryption from the homepage through the Internet and the encrypted program is executed by using the key information and installed into a computer.

Naturally, the invention incorporates not only a case where the computer executes the read-out program codes, so that the functions of the embodiments mentioned above are realized but also a case where the OS (Operating System) which is operating on the computer executes a part or all of actual processes on the basis of instructions of the program codes, and the functions of the embodiments mentioned above are realized by those processes.

Further, the invention also incorporates a case where the program codes read out from the storing medium are written into a memory provided for a function expanding board inserted in a computer or a function expanding unit connected to the computer and, thereafter, a CPU or the like provided for the function expanding board or the function expanding unit executes a part or all of actual processes and the functions of the embodiments mentioned above are realized by those processes.

The invention is not limited to the foregoing embodiments but many various modifications (including organic combinations of the embodiments) are possible on the basis of the spirit of the invention and they are not excluded from the scope of the invention.

As described above, according to the invention, the following effects are obtained. That is, when the electronic document formed by the application is encrypted, stored, and managed in the state where the access permission attributes and the ID information per function have been set into the electronic document, the access permission information is set into the managed electronic document on the basis of the simple attribute information changing instruction, and the attribute information is automatically updated in accordance with the individual attribute change request regarding the attribute information. Therefore, the predetermined attribute information for executing the various data processes of the electronic document which has already been formed is freely changed. That is, with respect to the electronic document which has already been formed, in accordance with the attribute change request from the user, the attributes set into the formed electronic document can be freely changed into the attributes (including the permission attributes of the browsing, printing, and the like) which are different from those upon registration and managed by the simple operation without repeating similar electronic document forming processes by expanding or restricting the original attributes.

What is claimed is:

1. A document processing system comprising:
   a storing unit configured to store a document for which neither viewing nor printing is permitted;
   a first registration unit configured to generate a first password for viewing the document and a second password for changing access right to the document, and configured to register the first and second passwords in a management table;
   a first setting unit configured to set the first and second passwords registered by the first registration unit into the document;
   a first discrimination unit configured to discriminate whether or not access right to the document is to be enlarged;
   a second discrimination unit configured to discriminate whether the first password is identical to or different from a third password for viewing the document designated by a managing operator, if the first discrimination unit discriminates that access right to the document is to be enlarged;
   a third discrimination unit configured to discriminate whether the second password is identical to or different from a fourth password for changing access right to the document designated by the managing operator, if the first discrimination unit discriminates that access right to the document is to be enlarged;
   a second registration unit configured to set a view ID into the document and to register the view ID and the third password in the management table, if the second discrimination unit discriminates that the first password is different from the third password, and configured to set a print ID into the document and to register the print ID and the fourth password in the management table, if the third discrimination unit discriminates that the second password is different from the fourth password;

a first accepting unit configured to accept a fifth password for viewing the document designated by an operator, if the operator gives an instruction for reading the document stored by the storing unit;

a second accepting unit configured to accept a sixth password for changing access right to the document designated by the operator, if the operator gives the instruction for reading the document;

a first collection unit configured to collect the view ID from the document, if the fifth password accepted by the first accepting unit is different from the first password set into the document;

a second collection unit configured to collect the print ID from the document, if the sixth password accepted by the second accepting unit is different from the second password set into the document;

a first decryption unit configured to generate a first encryption key from the view ID collected by the first collection unit and to decrypt the third password registered in the management table with the first encryption key;

a second decryption unit configured to generate a second encryption key from the print ID collected by the second collection unit and to decrypt the fourth password registered in the management table with the second encryption key;

a first obtaining unit configured to decrypt the document and obtain the decrypted document, if the third password decrypted by the first decryption unit is identical to the fifth password;

a second obtaining unit configured to decrypt the document and obtain the decrypted document, if the fourth password decrypted by the second decryption unit is identical to the sixth password;

a first permission unit configured to read a view setting of the document registered in the management table based on the view ID and to permit viewing of the document obtained by the first obtaining unit based on the read view setting, wherein the first permission unit permits the viewing of the document not based on a view permission setting set in the document itself, but based on a view permission setting of the document registered in the management table; and a second permission unit configured to read a print setting of the document registered in the management table based on the print ID and to permit printing of the document obtained by the second obtaining unit based on the read print setting, wherein the second permission unit permits the printing of the document not based on a print permission setting set in the document itself, but based on a print permission setting of the document registered in the management table.

2. A document processing system comprising:

a storing unit configured to store a document for which printing is not permitted;

a first registration unit configured to register a first password used for the document in a management table;

a first setting unit configured to set the first password registered by the first registration unit into the document;

a first discrimination unit configured to discriminate whether or not access right to the document is to be changed;

a second discrimination unit configured to discriminate whether the first password is identical to or different from a second password for changing setting of the document designated by a managing operator, if the first discrimination unit discriminates that access right to the document is to be changed;

a second registration unit configured to set a function ID into the document and register the function ID and the second password in the management table, if the second discrimination unit discriminates that the first password is different from the second password;

an accepting unit configured to accept a third password for accessing the document designated by an operator, if the operator gives an instruction for reading the document stored by the storing unit;

a collection unit configured to collect the function ID from the document, if the third password accepted by the accepting unit is different from the first password set into the document;

a decryption unit configured to generate an encryption key from the function ID collected by the collection unit and to decrypt the second password registered in the management table with the encryption key;

an obtaining unit configured to decrypt the document and obtain the decrypted document, if the second password decrypted by the decryption unit is identical to the third password; and a permission unit configured to read a print setting of the document registered in the management table based on the function ID and to permit printing of the document obtained by the obtaining unit based on the read print permission setting, wherein the permission unit permits the printing of the document not based on a print permission setting set in the document itself, but based on a print permission setting of the document registered in the management table.

3. A document processing system method comprising:

storing a document for which neither viewing nor printing is permitted;

generating a first password for viewing the document and a second password for changing access right to the document;

registering the first and second passwords in a management table;

setting the first and second passwords into the document;

a first discriminating of whether or not access right to the document is to be enlarged;

a second discriminating of whether the first password is identical to or different from a third password for viewing the document designated by a managing operator, if the first discrimination discriminates that access right to the document is to be enlarged;

a third discriminating of whether the second password is identical to or different from a fourth password for changing access right to the document designated by the managing operator, if the first discrimination discriminates that access right to the document is to be enlarged;

setting a view ID into the document and registering the view ID and the third password in the management table, if the second discrimination discriminates that the first password is different from the third password;

setting a print ID into the document and registering the print ID and the fourth password in the management table, if the third discrimination discriminates that the second password is different from the fourth password;

accepting a fifth password for viewing the document designated by an operator, if the operator gives an instruction for reading the stored document;

accepting a sixth password for changing access right to the document designated by the operator, if the operator gives the instruction for reading the document;

collecting the view ID from the document, if the fifth password is different from the first password set into the document;

collecting the print ID from the document, if the sixth password is different from the second password set into the document;

generating a first encryption key from the collected view ID and decrypting the third password registered in the management table with the first encryption key;

generating a second encryption key from the collected print ID and decrypting the fourth password registered in the management table with the second encryption key;

decrypting the document and obtaining the decrypted document, if the decrypted third password is identical to the fifth password;

decrypting the document and obtaining the decrypted document, if the decrypted fourth password is identical to the sixth password;

reading a view setting of the document registered in the management table based on the view ID and permitting viewing of the obtained decrypted document based on the read view setting, wherein viewing of the document is permitted not based on a view permission setting set in the document itself, but based on a view permission setting of the document registered in the management table; and reading a print setting of the document registered in the management table based on the print ID and permitting printing of the obtained decrypted document based on the read print setting, wherein printing of the document is permitted not based on a print permission setting set in the document itself, but based on a print permission setting of the document registered in the management table.

4. A document processing method comprising:

storing a document for which printing is not permitted;

registering a first password used for the document in a management table;

setting the first password into the document;

a first discriminating of whether or not access right to the document is to be changed;

a second discriminating of whether the first password is identical to or different from a second password for changing setting of the document designated by a managing operator, if the first discrimination discriminates that access right to the document is to be changed;

setting a function ID into the document and registering the function ID and the second password in the management table, if the second discrimination discriminates that the first password is different from the second password;

accepting a third password for accessing the document designated by an operator, if the operator gives an instruction for reading the stored document;

collecting the function ID from the document, if the third password is different from the first password set into the document;

generating an encryption key from the collected function ID and decrypting the second password registered in the management table with the encryption key;

obtaining the decrypted document, if the decrypted second password is identical to the third password; and reading a print setting of the document registered in the management table based on the function ID and permitting printing of the obtained decrypted document based on the read print permission setting, wherein printing of the document is permitted not based on a print permission setting set in the document itself, but based on a print permission setting of the document registered in the management table.

* * * * *